(12) United States Patent
Nomura

(10) Patent No.: US 7,816,127 B2
(45) Date of Patent: Oct. 19, 2010

(54) WASTE TREATMENT APPARATUS

(75) Inventor: Tokumitsu Nomura, Mihara (JP)

(73) Assignee: Koai Industry Co., Ltd., Hiroshima (JP)

( * ) Notice: Subject to any disclaimer, the term of this patent is extended or adjusted under 35 U.S.C. 154(b) by 726 days.

(21) Appl. No.: 11/569,572

(22) PCT Filed: Sep. 15, 2004

(86) PCT No.: PCT/JP2004/013441

§ 371 (c)(1), (2), (4) Date: Nov. 24, 2006

(87) PCT Pub. No.: WO2005/115647

PCT Pub. Date: Dec. 8, 2005

(65) Prior Publication Data

US 2007/0298488 A1   Dec. 27, 2007

(30) Foreign Application Priority Data

May 25, 2004 (JP) .............................. 2004-155183

(51) Int. Cl.
*C12M 1/00* (2006.01)
(52) U.S. Cl. ................ 435/290.4; 435/290.1; 366/309; 366/325.5; 366/327.3; 366/329.1
(58) Field of Classification Search .................. 241/606; 366/209, 325.4, 325.5, 325.8, 327.1, 327.2–327.5, 366/329.1, 292, 309, 325.1, 329.3; 435/290.1, 435/290.3, 290.4
See application file for complete search history.

(56) References Cited

U.S. PATENT DOCUMENTS 2,295,136 A * 9/1942 Stiers .......................... 366/98
(Continued)

FOREIGN PATENT DOCUMENTS

JP   07-204615 A   8/1995
(Continued)

OTHER PUBLICATIONS

Machine translation of JP 2003-211135.*
(Continued)

*Primary Examiner*—William H Beisner
*Assistant Examiner*—Michael Hobbs
(74) *Attorney, Agent, or Firm*—Keating & Bennett, LLP

(57) ABSTRACT

A waste treatment apparatus decomposes waste by the microorganisms to perform annihilation treatment. The waste treatment apparatus includes a treatment tank which accommodates the microorganisms together with the waste, and an agitation device arranged to agitate the microorganisms together with the waste. The agitation device includes a plurality of agitating tools arranged at predetermined intervals in the axial direction of a rotation shaft. The agitating tools have paddle arms, respectively, which are disposed so as to be opposed to each other in a diameter direction of the rotation shaft, and blades, respectively, which are disposed at predetermined distances apart from an inner wall of the treatment tank and are inclined with respect to the axis of the paddle arms. The blade on one side is inclined forward in a direction in which the front side thereof with respect to the rotation direction of the paddle arm approaches the rotation shaft. The blade on the other side is inclined backward in a direction in which the rear side thereof with respect to the rotation direction of the paddle arm 70b approaches the rotation shaft.

10 Claims, 30 Drawing Sheets

U.S. PATENT DOCUMENTS 4,859,594 A * 8/1989 Portier .................. 435/448
6,110,732 A * 8/2000 Endo et al. ............. 435/290.2
6,258,594 B1   7/2001 Nakaya

FOREIGN PATENT DOCUMENTS

| JP | 09-1112 A | 1/1997 |
| JP | 11-300320 A | 11/1999 |
| JP | 2000-334427 A | 5/2000 |
| JP | 2000-334426 A | 12/2000 |
| JP | 2001-58200 A | 3/2001 |
| JP | 2001-321745 A | 11/2001 |
| JP | 2002-018358 A | 1/2002 |
| JP | 2002-192128 A | 7/2002 |
| JP | 2003-211135 * | 7/2003 |

OTHER PUBLICATIONS

Machine translation of JP 2001-58200 (listed on 1449 received on Nov. 24, 2006).*

Official communication issued in the corresponding International Application No. PCT/JP2004/013441, mailed on Dec. 7, 2006.

Official communication issued in the corresponding International Application No. PCT/JP2004/013441, mailed on Nov. 9, 2004.

Official communication issued in counterpart Japanese Application No. 2005-512625, mailed on Feb. 21, 2006.

* cited by examiner

WASTE TREATMENT APPARATUS

BACKGROUND OF THE INVENTION

1. Field of the Invention

The present invention relates to a waste treatment apparatus. In particular, the present invention relates to a waste treatment apparatus for performing volume reduction-annihilation treatment by decomposing, by microorganisms, various raw waste such as vegetables, meats, and fishes, various plastic waste such as plastic bags and foamed trays, various paper waste such as paper bags, paper cartons, corrugated cardboard, newspaper, and paper diapers, and other waste.

2. Description of the Related Art

An organic waste treatment apparatus is been disclosed in Japanese Patent Laid-Open Publication No. Hei 9-1112 (Patent Document 1). In this organic waste treatment apparatus, microorganisms are added to organic waste, such as raw waste (leftovers, noodles, fishes, vegetable scraps, meats, fruits, chicken egg shells, fish bones, etc.), and the organic waste is decomposed into water and carbonic acid gas in a main body while the organic waste is agitated in the main body. Furthermore, in this organic waste treatment apparatus, a rotation shaft is provided slightly above a generally central portion of the main body. The rotation shaft rotates through a motor with a speed reducer, a sprocket, a chain, and other components. Provided in the rotation shaft are a plurality of agitating elements, such as paddles, for agitating the organic waste, such as raw waste, fed into the main body (see, for example, FIGS. 2 and 3 in Patent Document 1).

In this organic waste treatment apparatus, upon starting the motor with a speed reducer, the rotation shaft rotates, and the organic waste, such as raw waste, is agitated by the agitating elements, such as paddles. As the organic waste is agitated, the decomposition of the organic waste by the microorganisms added thereto is promoted and occurs uniformly, and the organic waste is decomposed into water, carbonic acid gas, and a very small amount of solid contents.

Furthermore, in this organic waste treatment apparatus, a circulation passage for circulating air in the main body is provided in an upper portion of the main body. Moreover, successively provided in the circulation passage are: a moisture removal device, such as an evaporator, for removing moisture in the air in the circulation passage; and an air heating device, such as a condenser or a heater, for heating the air from which moisture has been removed by the moisture removal device. Part of the air heated by the air heating device passes through the circulation passage and is supplied to and recirculated into the main body, and part of the air passes through an exhaust passage that is branched from the circulation passage and is discharged outside the main body through a deodorizing device provided in the middle portion of the exhaust passage (see, for example, FIG. 2 of Patent Document 1). In this case, foul odors are prevented from being discharged outside the main body.

However, when the agitating elements, such as paddles, used in such a conventional waste treatment apparatus (see, for example, FIGS. 2 and 3 of Patent Document 1) are used, the efficiency of agitating raw waste and other waste in a main body is not always high even if the organic waste is crushed by a crusher and then fed into the main body. For example, a bridge phenomenon occurs in which the end portion of a puddle carries ball-like clusters of raw waste and other waste, and thus the raw waste and other waste cannot be agitated uniformly and efficiently. Furthermore, the raw waste remains in a portion along the inner wall of the main body. Therefore, the efficiency of agitating raw waste and other waste is reduced, and a problem occurs in that decomposition treatment (fermentation treatment) by microorganisms takes a very long time.

In such a conventional waste treatment apparatus, the problem described above occurs even when only the so-called raw waste, such as food scraps and leftovers, is treated. Therefore, when raw waste is agitated in the main body together with plastic waste including plastic bags and plastic packaging containers such as styrofoam trays and/or paper waste such as newspaper, corrugated cardboard, and paper diapers, the agitation efficiency is further reduced. That is to say, such a conventional waste treatment apparatus is not suitable for simultaneously subjecting waste including raw waste mixed with plastic waste and paper waste to decomposition treatment (fermentation treatment) by microorganisms. Therefore, in such a conventional waste treatment apparatus, at least plastic waste must be separated from raw waste and/or paper waste, and thus a lot of effort is required.

SUMMARY OF THE INVENTION

To overcome the problems described above, preferred embodiments of the present invention provide a waste treatment apparatus capable of performing volume reduction-annihilation treatment by decomposing, by microorganisms, waste including plastic waste, raw waste, paper waste, and other waste while these types of waste are efficiently agitated together.

A waste treatment apparatus according to the present invention is a waste treatment apparatus for performing volume reduction-annihilation treatment by decomposing waste by microorganisms while the waste is agitated. The waste treatment apparatus includes a treatment tank which accommodates the microorganisms and the waste, and an agitation device arranged to agitate the microorganisms and the waste. The agitation device includes a rotation shaft provided in the treatment tank and a plurality of agitating tools arranged at predetermined intervals in an axial direction of the rotation shaft. Each of the agitating tools has a pair of paddle arms and blades, the paddle arms being disposed so as to be opposed to each other in a diameter direction of the rotation shaft, the blade being disposed in an end portion of the paddle arm so as to be inclined with respect to an axis of the paddle arm and so as to be separated from an inner wall of the treatment tank by a predetermined distance. One of the blades is inclined forward in a direction in which a front side of the blade with respect to a rotation direction of the paddle arms approaches the rotation shaft. The other of the blades is inclined backward in a direction in which a rear side of the blade with respect to the rotation direction of the paddle arms approaches the rotation shaft.

While each of the paddle arms of the agitating tools is rotated through the rotation of the rotation shaft, the waste in the treatment tank collide with each other due to the agitating action of the agitating tools, and the waste collide with the paddle arms and the blades. In addition, the waste collide with the inner wall of the treatment tank, whereby the waste is crushed and divided into small pieces to promote decomposition of the waste by the microorganisms.

When each of the blades provided in the respective end portions of the paddle arms is close to the inner wall of the treatment tank, the waste enter the space between each of the blades and the inner wall of the treatment tank. The waste which has entered the space between each of the blades and the inner wall of the treatment tank are pressed against the inner wall of the treatment tank through the blades receiving the rotational force of the paddle arms and are then crushed.

Attention is now paid to the motion of the pair of paddle arms and the blades. As for the blade on one side, when the front side of this blade is inclined in a direction in which the front side approaches the rotation shaft, the rear side of the blade is inclined in a direction in which the rear side approaches the inner wall of the treatment tank. That is, a narrow width portion having a narrow gap is provided between the rear side of the blade and the inner wall of the treatment tank, and a large width portion having a large gap is provided between the front side of the blade and the inner wall of the treatment tank.

In this case, the waste is efficiently ground between the large width portion of the blade and the inner wall of the treatment tank, and the ground waste is efficiently scraped in the narrow width portion of the blade. Furthermore, for a pair of the agitating tools, the waste entering the space between the blade of the paddle arm on one side and the inner wall of the treatment tank are pressed against the inner wall of the treatment tank through the rotational force of the paddle arms and are crushed. Furthermore, the waste that is crushed and divided into small pieces by the blade on the one side adhere to the inner wall of the treatment tank and are stacked to a certain thickness. However, the waste adhering to and stacked on the inner wall is scooped and scraped by the narrow width portion of the blade of the paddle arm on the other side rotating in the same trajectory.

A waste treatment apparatus according to another preferred embodiment for performing volume reduction-annihilation treatment by decomposing, by aerobic microorganisms, waste including plastic waste, raw waste, paper waste, and the like while the waste is agitated together with the aerobic microorganisms and a support material to which the aerobic microorganisms adhere and which functions as a residence of the aerobic microorganisms. The waste treatment apparatus includes a treatment tank which accommodates the aerobic microorganisms and the support material together with the waste, an agitation device arranged to agitate the aerobic microorganisms, the support material, and the waste together, an activation device arranged to activate decomposition action of the aerobic microorganisms on the waste by supplying air into the treatment tank and heating an inside of the treatment tank to a predetermined temperature; an exhaust device arranged to exhaust exhaust gas containing water vapor and carbon dioxide generated in the treatment tank to outside the treatment tank, a dust removal device arranged to remove dust in the exhaust gas exhausted by the exhaust device and to evaporate moisture in the exhaust gas, and a deodorization device arranged to remove foul odors in the exhaust gas treated by the dust removal device by heating the exhaust gas at high temperatures. The agitation device includes a rotation shaft provided in the treatment tank and a plurality of agitating tools arranged at predetermined intervals in an axial direction of the abovementioned rotation shaft. Each of the agitating tools has a pair of paddle arms and blades, the paddle arms being disposed so as to be opposed to each other in a diameter direction of the rotation shaft, the blade being disposed in an end portion of the paddle arm so as to be inclined with respect to an axis of the paddle arms and so as to be separated from an inner wall of the treatment tank by a predetermined distance. One of the blades is inclined forward in a direction in which a front side of the blade with respect to a rotation direction of the paddle arms approaches the rotation shaft. The other of the blades is inclined backward in a direction in which a rear side of the blade with respect to the rotation direction of the paddle arms approaches the rotation shaft.

The aerobic microorganisms, the support material, and the waste accommodated in the treatment tank are agitated together by the plurality of agitating tools of the agitation device. These agitating tools have the same configuration, action, and effects as those of the waste treatment apparatus according to the first preferred embodiment described above. The activation device activates the decomposition action of the aerobic microorganisms on the waste by supplying air into the treatment tank and heating the inside of the treatment tank to a predetermined temperature. The exhaust gas containing water vapor and carbon dioxide, which are generated in the treatment tank through the decomposition action of the aerobic microorganisms on the waste, is exhausted outside the treatment tank by the exhaust device. The dust removal device removes the dust in the exhaust gas exhausted by the exhaust device and evaporates moisture in the exhaust gas. The deodorization device removes foul odors in the exhaust gas treated by the dust removal device by heating the exhaust gas at high temperatures.

Preferably, the waste treatment apparatus further includes an assisting device arranged to assist heating of the treatment tank through heat of exhaust-heat gas deodorized by the deodorization device.

The heat of the exhaust-heat gas deodorized by the deodorization device assists the heating of the treatment tank through the assisting device. Therefore, the entire treatment tank is efficiently heated.

The support material to which the aerobic microorganisms adhere and which functions as the residence of the aerobic microorganisms preferably includes a sharp piece made of a sintered porous material.

The support material including the sharp piece formed of a sintered porous material is agitated together with the waste including plastic waste, raw waste, paper waste, and other waste. In this case, when the support material collides with the waste, a sharp portion of the support material cuts the waste to crush and divide the waste into small pieces.

In the waste treatment apparatus according to the embodiments described above, an inclination angle of the blade with respect to the paddle arm is preferably set within a range of about 1° to about 15°.

According to experiments performed by the present inventor, when the inclination angle of the blade with respect to the paddle arm is set within the range of about 1° to about 15°, the waste is more efficiently agitated and is effectively ground between the blade and the inner wall of the treatment tank to divide the waste into small pieces.

With the waste treatment apparatus according to preferred embodiments of the present invention, waste including plastic waste, raw waste, paper waste, and other waste can be subjected to volume reduction-annihilation treatment by decomposing the waste by microorganisms while these types of waste are efficiently agitated together. Therefore, for example, raw waste and/or paper waste is not required to be separated from waste such as plastics, and thus these waste can be treated together. Hence, with the waste treatment apparatus according to the present invention, in contrast to a conventional waste treatment apparatus, little effort is required to separate waste, and thus the effects is more apparent.

The foregoing and other objects, features, and advantages of the present invention will become more apparent from the following detailed description of the best mode for carrying out the invention with reference to the drawings.

DETAILED DESCRIPTION OF PREFERRED EMBODIMENTS

In the waste treatment apparatus according to preferred embodiments of the present invention, subjecting waste including plastic waste, raw waste, waste such as paper, and other types of waste to volume reduction-annihilation treatment by decomposing the waste by microorganisms while the waste is efficiently agitated together can be achieved without separating, for example, raw waste and/or waste such as paper from waste such as plastic, in contrast to a conventional apparatus.

Figure 1:
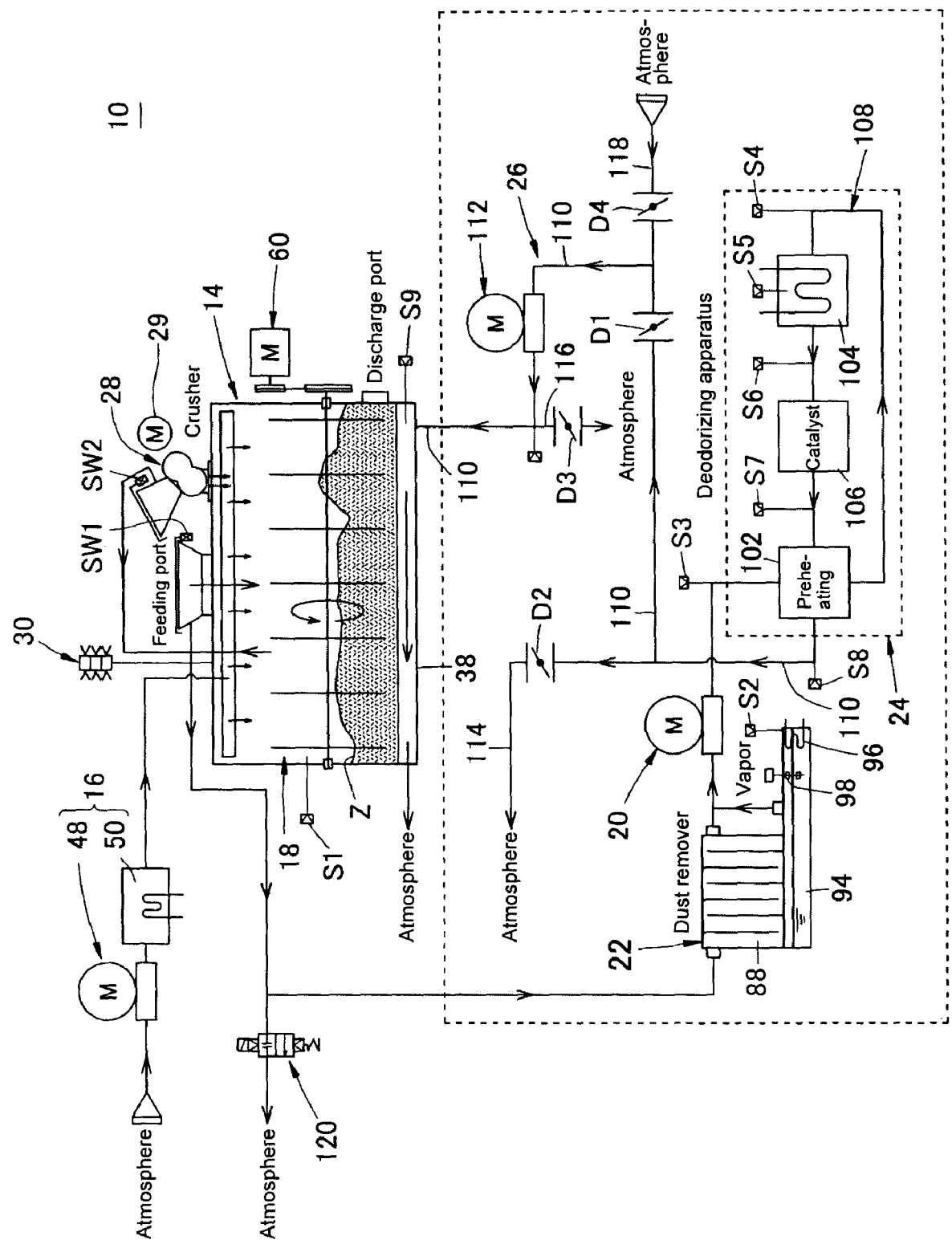
FIG. 1 is a flow diagram illustrating an example of a preferred embodiment of the waste treatment apparatus according to the present invention.
Figure 2:
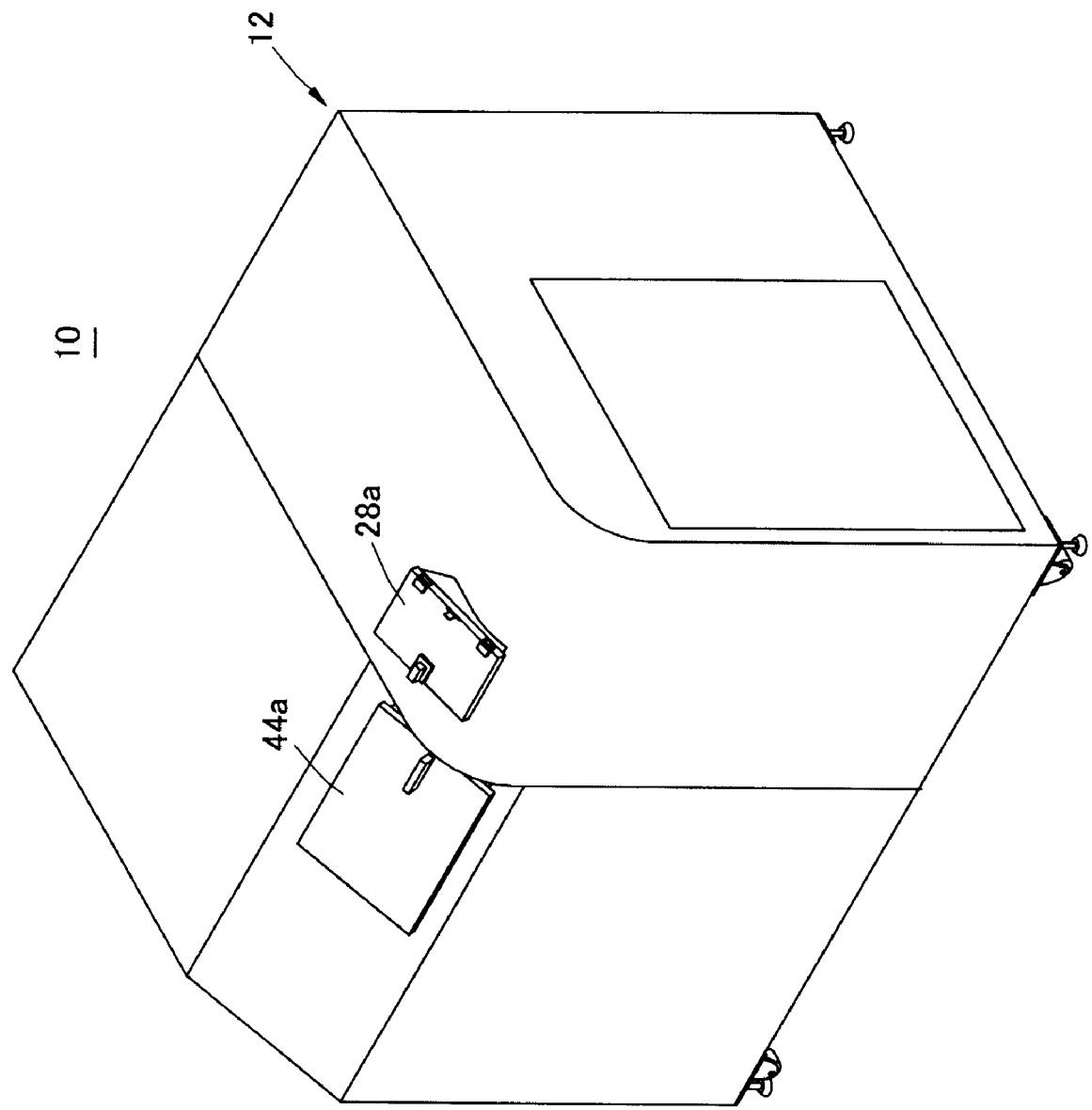
FIG. 2 is an outside view illustrating the example of the preferred embodiment of the waste treatment apparatus according to the present invention.
Figure 3:
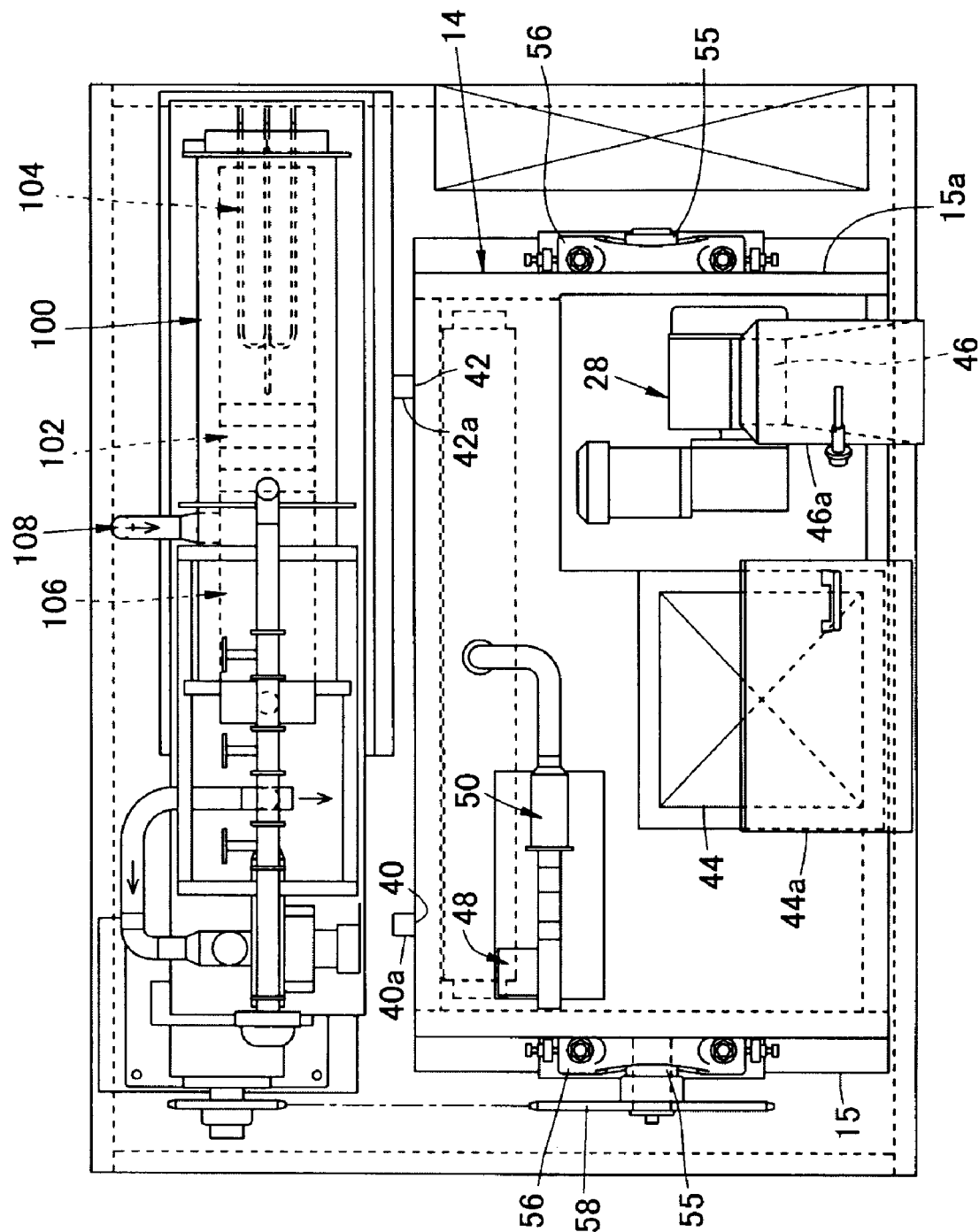
FIG. 3 is a plan view illustrating the example of the preferred embodiment of the waste treatment apparatus according to the present invention.
Figure 4:
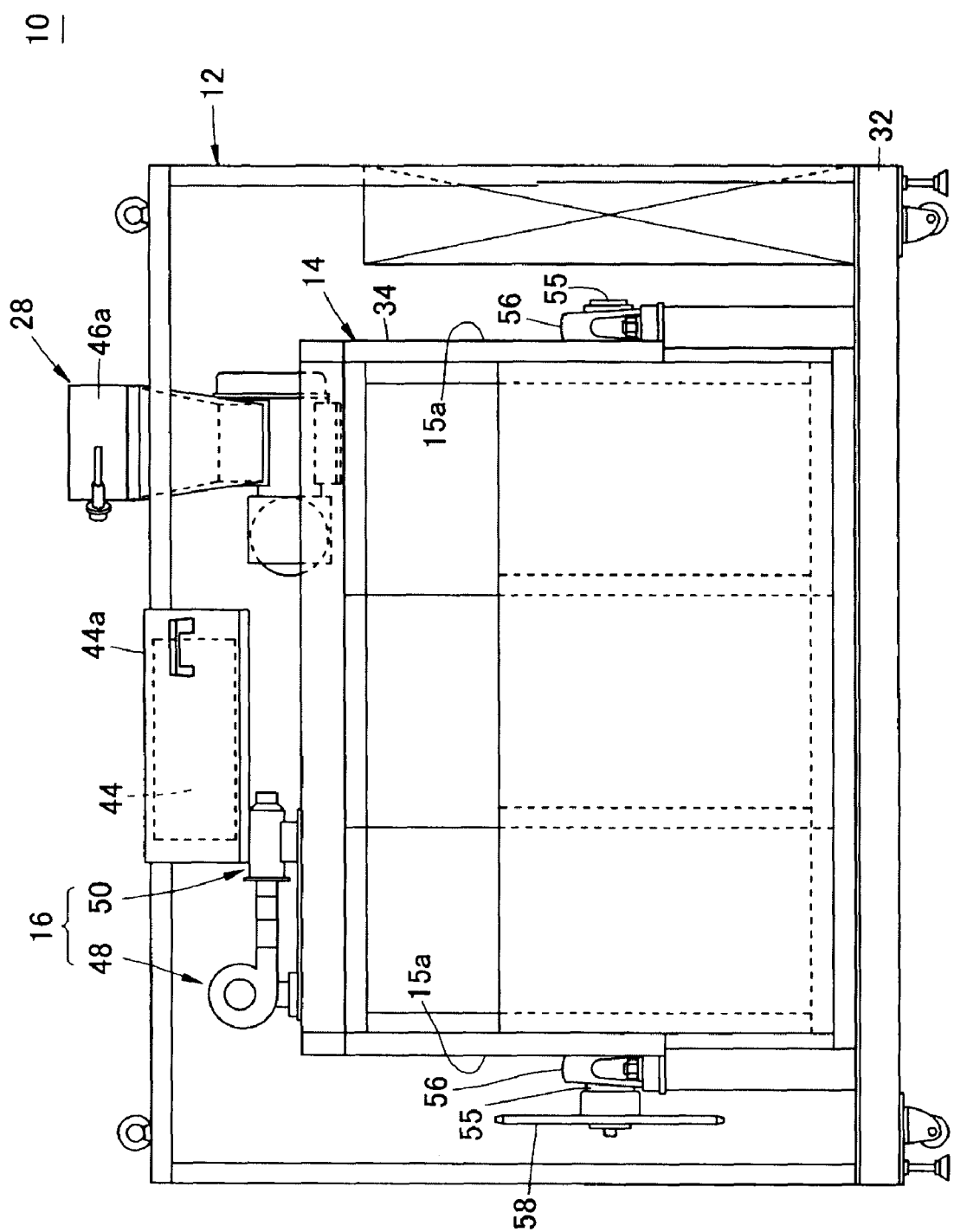
FIG. 4 is a front view illustrating the example of the preferred embodiment of the waste treatment apparatus according to the present invention.
Figure 5:
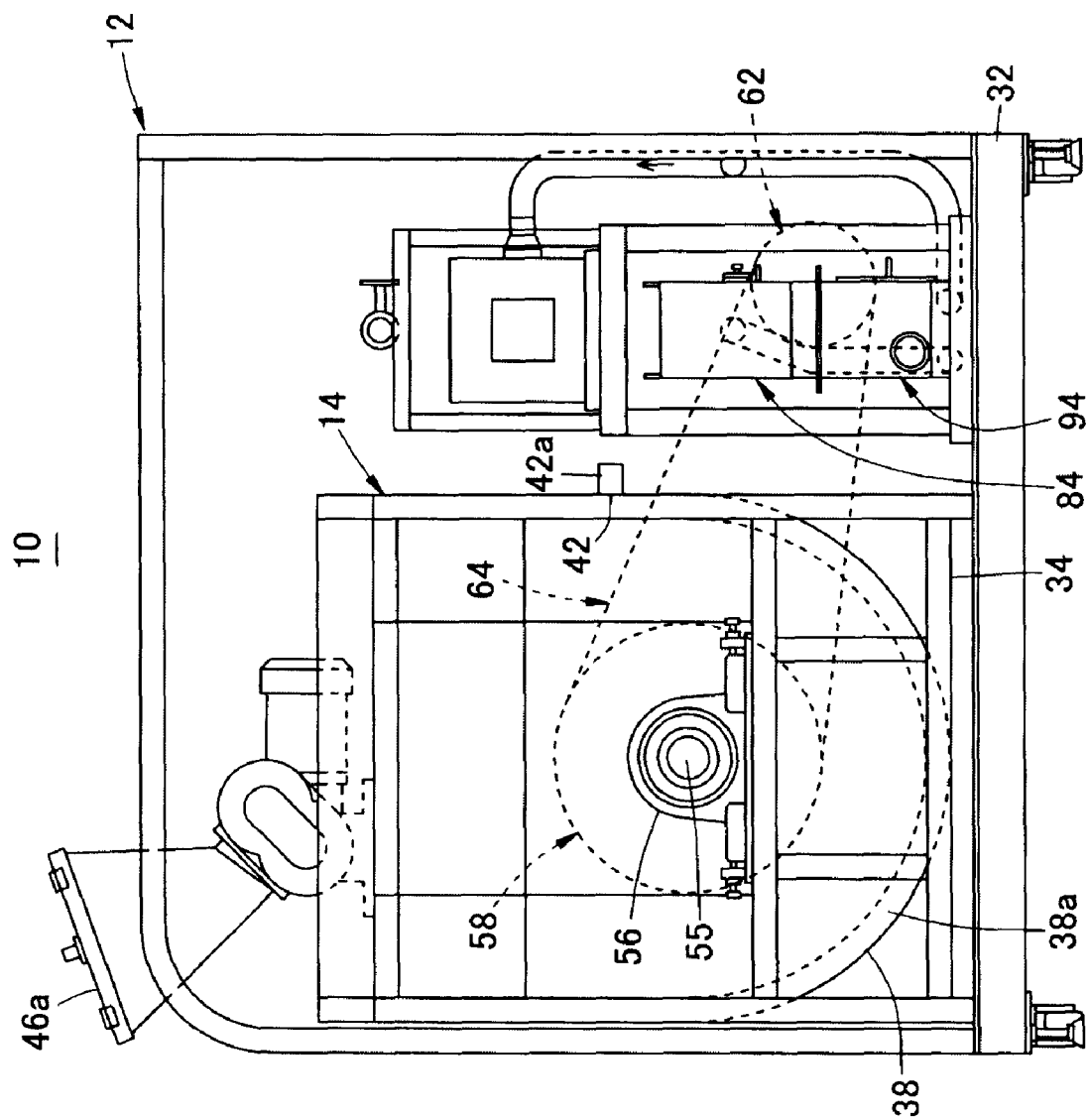
FIG. 5 is a right side view illustrating the example of the preferred embodiment of the waste treatment apparatus according to the present invention.
Figure 6:
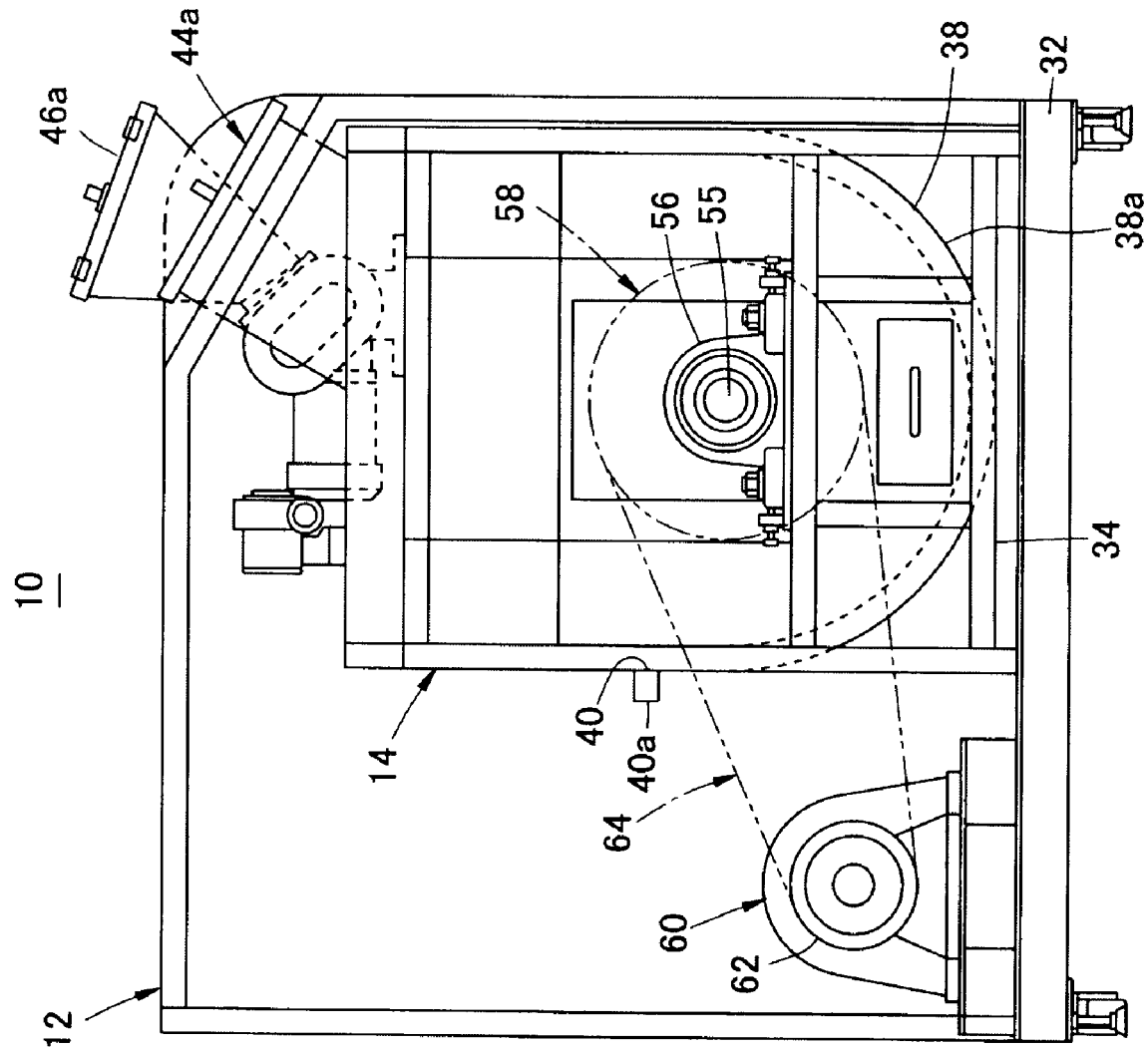
FIG. 6 is a left side view illustrating the example of the preferred embodiment of the waste treatment apparatus according to the present invention.
Figure 7:
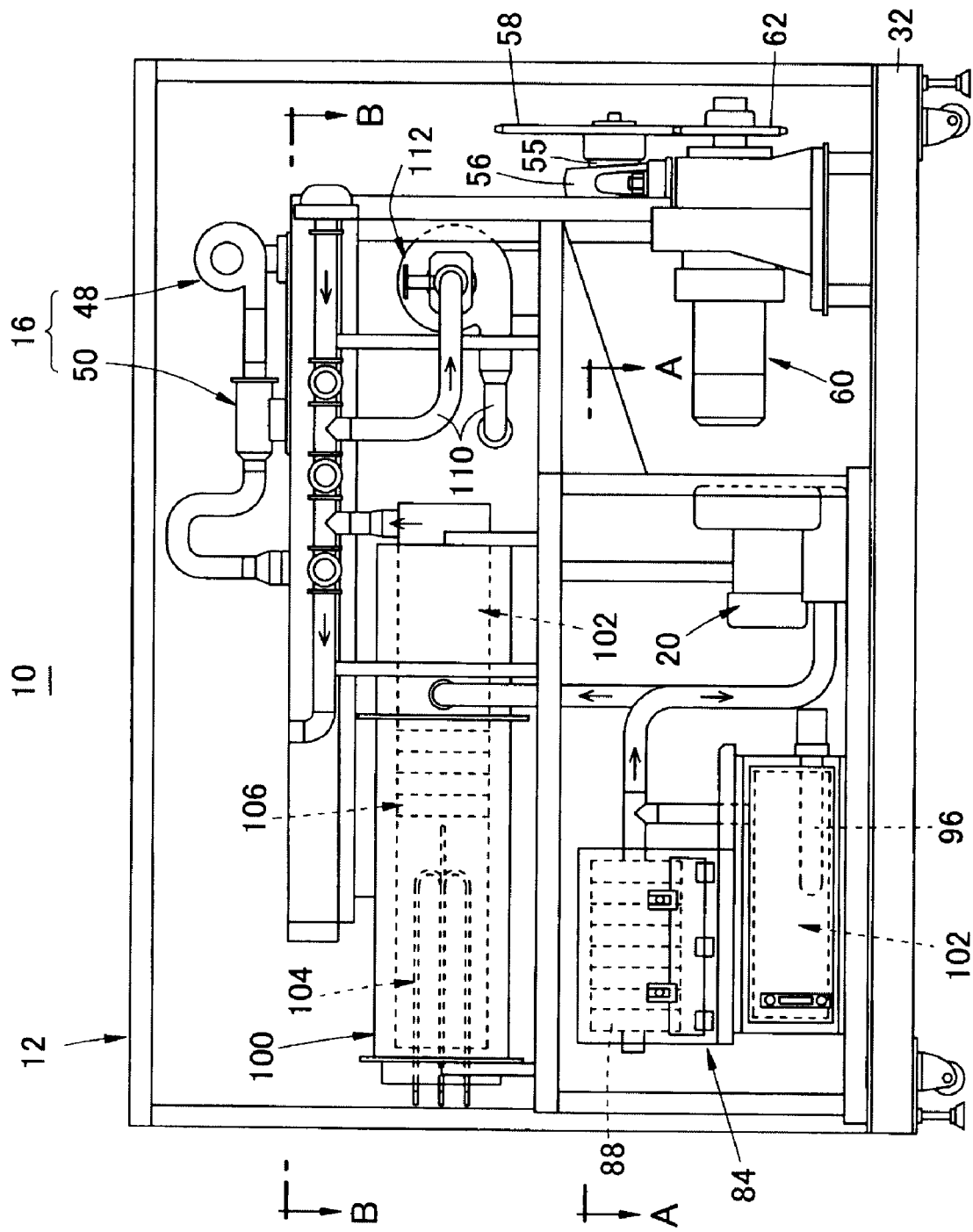
FIG. 7 is a rear view illustrating the example of the preferred embodiment of the waste treatment apparatus according to the present invention.

FIG. 1 is a flow diagram illustrating an example of a preferred embodiment of the waste treatment apparatus according to the present invention, and FIG. 2 is an outside view illustrating the example of the preferred embodiment of the waste treatment apparatus according to the present invention. FIG. 3 is a plan view illustrating the example of the preferred embodiment of the waste treatment apparatus according to the present invention, FIG. 4 is a front view thereof, FIG. 5 is a right side view thereof, FIG. 6 is a left side view thereof, and FIG. 7 is a rear view thereof.

First, a simple description will be given of a brief summary of the configuration of devices constituting a waste treatment apparatus 10 and of a flow of a waste treatment system by use of the waste treatment apparatus. Next, a description will be given of each of the devices constituting the waste treatment apparatus 10.

As shown in FIG. 2, this waste treatment apparatus 10 includes a housing 12, and each of the devices constituting the waste treatment apparatus 10 is accommodated in the housing 12. As shown in, for example, FIG. 1, provided in the housing 12 are: a treatment tank 14 in which waste is subjected to a volume reduction-annihilation treatment by decomposing the waste by aerobic microorganisms, an activation device 16 arranged to activate waste decomposition action of the aerobic microorganisms by supplying air into the treatment tank 14 and heating the inside of the treatment tank to a predetermined temperature, an agitation device 18 arranged to subject the waste fed into the treatment tank 14, the aerobic microorganisms, and a support material that functions as a residence of the aerobic microorganisms to agitation treatment, an exhaust device 20 arranged to exhaust, from the treatment tank 14, exhaust gas, such as carbon dioxide (carbonic acid gas) and water vapor, generated in the treatment tank 14 through the waste decomposition action of the aerobic microorganisms, a dust removal device 22 arranged to remove dust in the exhaust gas discharged from the treatment tank 14 and to evaporate moisture contained in the exhaust gas, a deodorization device 24 arranged to perform a deodorization treatment of removing foul odors in the exhaust gas treated by the dust removal means 22 by heating the exhaust gas at high temperatures, and an assisting device 26 arranged to assist heating-warming of the treatment tank 14 by utilizing the heat of exhaust-heat gas deodorized by the deodorization device 24. In addition to the above, also provided in the housing 12 are: temperature sensors S1 to S9, switches SW1 and SW2, dampers D1 to D4, a crusher 28 arranged to crush the waste to feed the waste into the treatment tank 14, an operation display signal 30 for the waste treatment apparatus, and other components.

Figure 8:
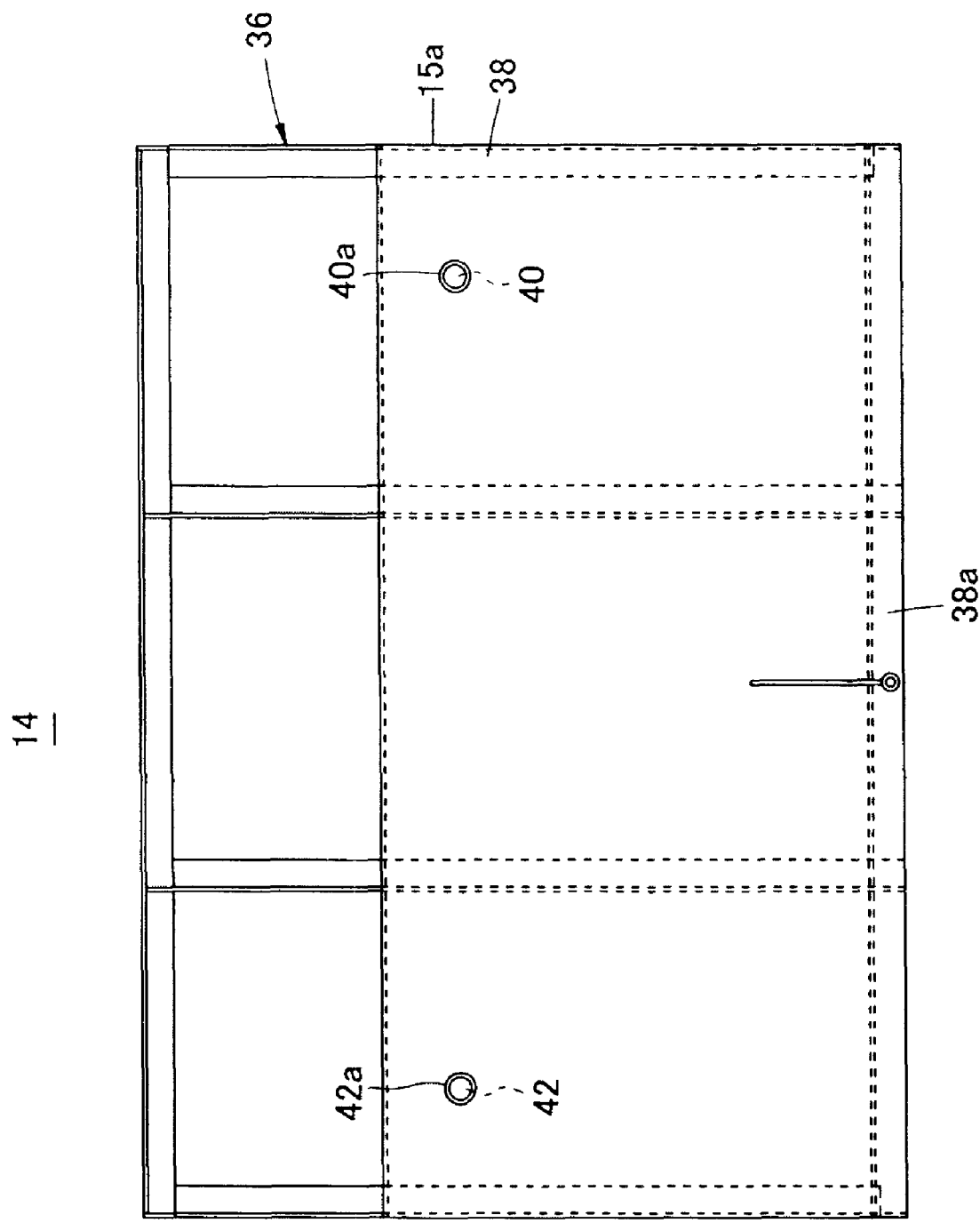
FIG. 8 illustrates an example of a treatment tank applied to the waste treatment apparatus according to the present invention and is an illustration viewed from the rear side of the waste treatment apparatus.
Figure 9:
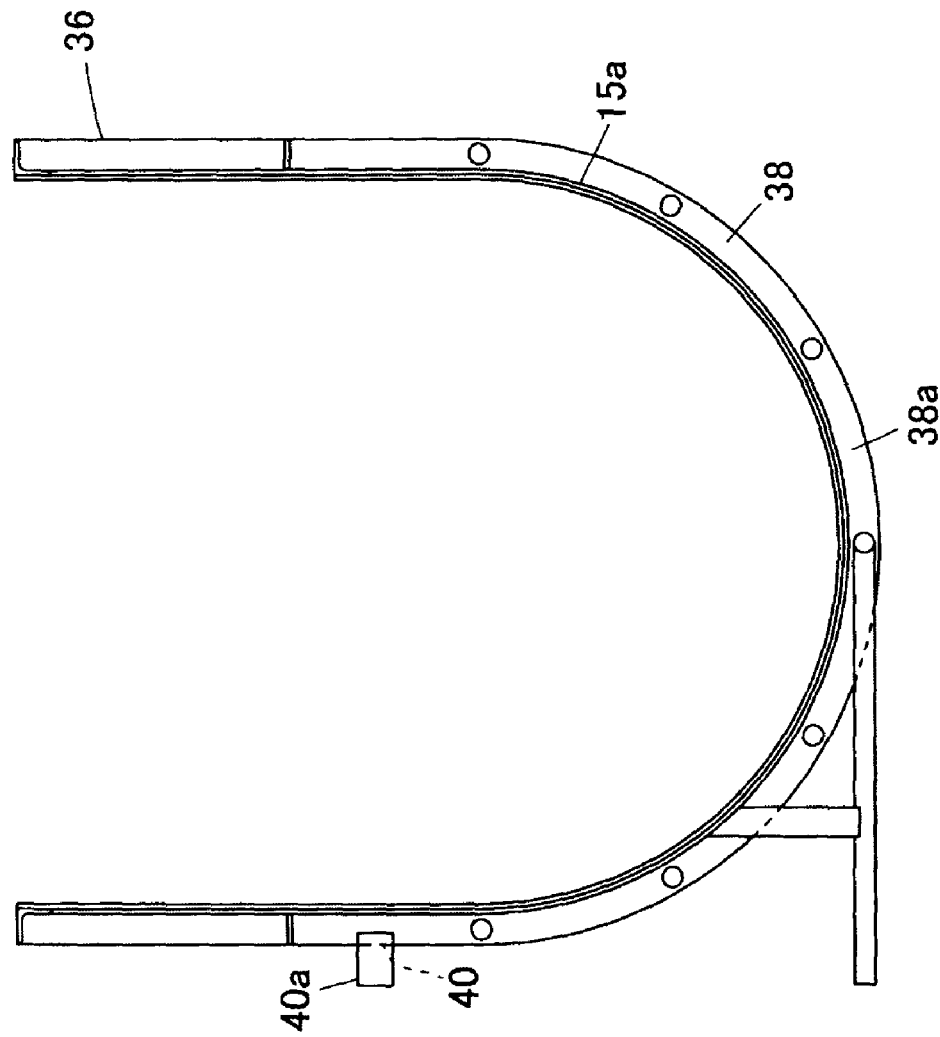
FIG. 9 illustrates the example of the treatment tank applied to the waste treatment apparatus according to the present invention and is an illustration viewed from the right side in FIG. 8.
Figure 10:
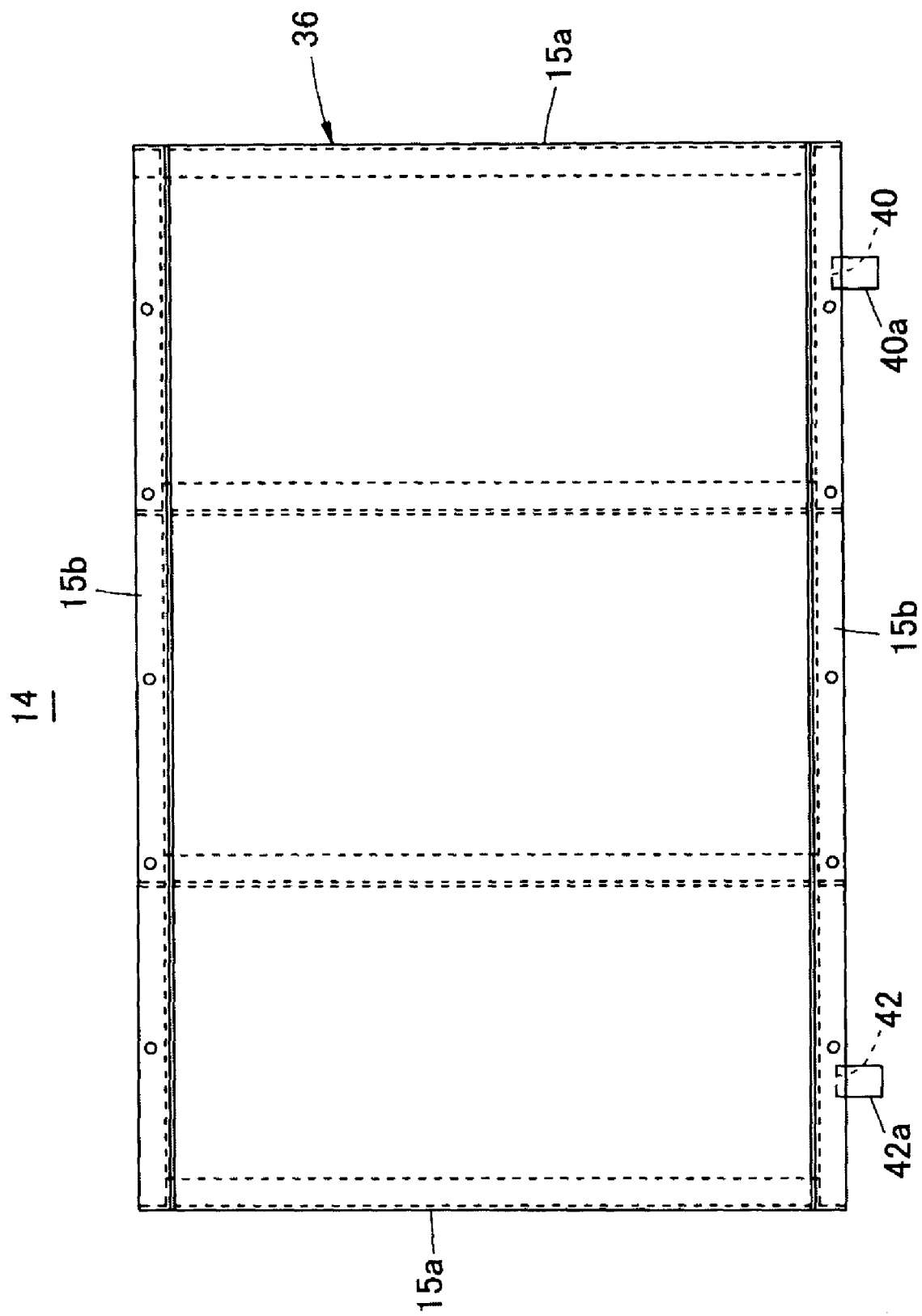
FIG. 10 illustrates the example of the treatment tank applied to the waste treatment apparatus according to the present invention and is an illustration viewed from the upper side in FIG. 8.

Next, a description will be given of the treatment tank 14 with reference to FIGS. 3 to 10. As shown in, for example, FIGS. 4 to 6, the treatment tank 14 is disposed on the front side of the housing 12 and is supported by a rack 34 provided on a base 32. As shown in FIGS. 8 to 10, the treatment tank 14 includes a treatment tank body 36 having a horizontally oriented rectangular-shaped front view and a generally U-shaped side view. The treatment tank body 36 is formed into a U-shaped trough-like shape by combining steel angles, stainless plates, and other components as appropriate. The treatment tank body 36 has a generally semicircular jacket portion 38 provided from the center in the height direction to the lower portion thereof as viewed in, for example, FIGS. 5, 6, and 9. The jacket portion 38 is formed of, for example, a hollow stainless plate, and a passage 38a is constructed therein. In the jacket portion 38, a passage inlet portion 40 is provided on the right side thereof in the lengthwise direction as viewed in FIGS. 8 and 10, and a passage outlet portion 42 is provided on the left side thereof in the lengthwise direction. An inlet pipe 40a and an outlet pipe 42a made of, for example, stainless steel are attached to the passage inlet portion 40 and the passage outlet portion 42, respectively.

As shown in, for example, FIGS. 2 to 6, a feeding port 44 in communication with the treatment tank 14 is provided on the front-side upper surface of the housing 12, and an openable-closable lid 44a is attached to the feeding port 44. Furthermore, a feeding port 46 for the crusher 28 is provided near the feeding port 44. The feeding port 46 is also in communication with the treatment tank 14, and an openable-closable lid 46a is attached to the feeding port 46. Various raw waste such as vegetables, meats, and fishes are directly fed through the feeding port 44. Various plastic waste such as plastic bags and foamed trays and various paper waste such as paper bags, paper carton, corrugated cardboard, newspaper, and paper diapers are fed through the feeding port 46 of the crusher 28 and are crushed into small pieces by the crusher 28. When the waste is not required to be crushed into small pieces by the crusher 28, various raw waste, various plastic waste, and various paper waste may be fed together through the feeding port 44.

In either case, various raw waste, various plastic waste, and various paper waste can be fed together into the treatment tank 14.

Furthermore, an aggregate Z of aerobic microorganisms for decomposing waste and a support material functioning as a residence of the aerobic microorganisms is accommodated in the treatment tank 14 in advance. This aggregate Z functions as a fungus bed and can be replenished into the treatment tank 14 through the feeding port 44 as appropriate. As the aerobic microorganisms, special complex fungi are used in which soil fungi, *Bacillus subtilis* natto, and other suitable fungi are mixed together, and the complex fungi are activated at a predetermined appropriate temperature to enhance the decomposition efficiency of waste. Moreover, the support material functioning as a residence of the aerobic microorganisms includes sharp crushed pieces composed of a sintered porous material such as tile, brick, and ceramic.

An activation device 16 is disposed on the treatment tank 14. The activation device 16 includes a blower 48, such as a sirocco fan, which supplies air into the treatment tank 14. The air supplied by the blower 48 is heated to a predetermined temperature (for example, 40° C. to 60° C.) by a heater 50 and is then supplied into the treatment tank 14 as hot air. The waste decomposition action of the aerobic microorganisms in the treatment tank 14 is activated by the hot air. Furthermore, this waste decomposition action can be further activated by waste grinding action, waste scraping action, and agitating action for agitating the waste uniformly by agitation device 18 described later.

Figure 11:
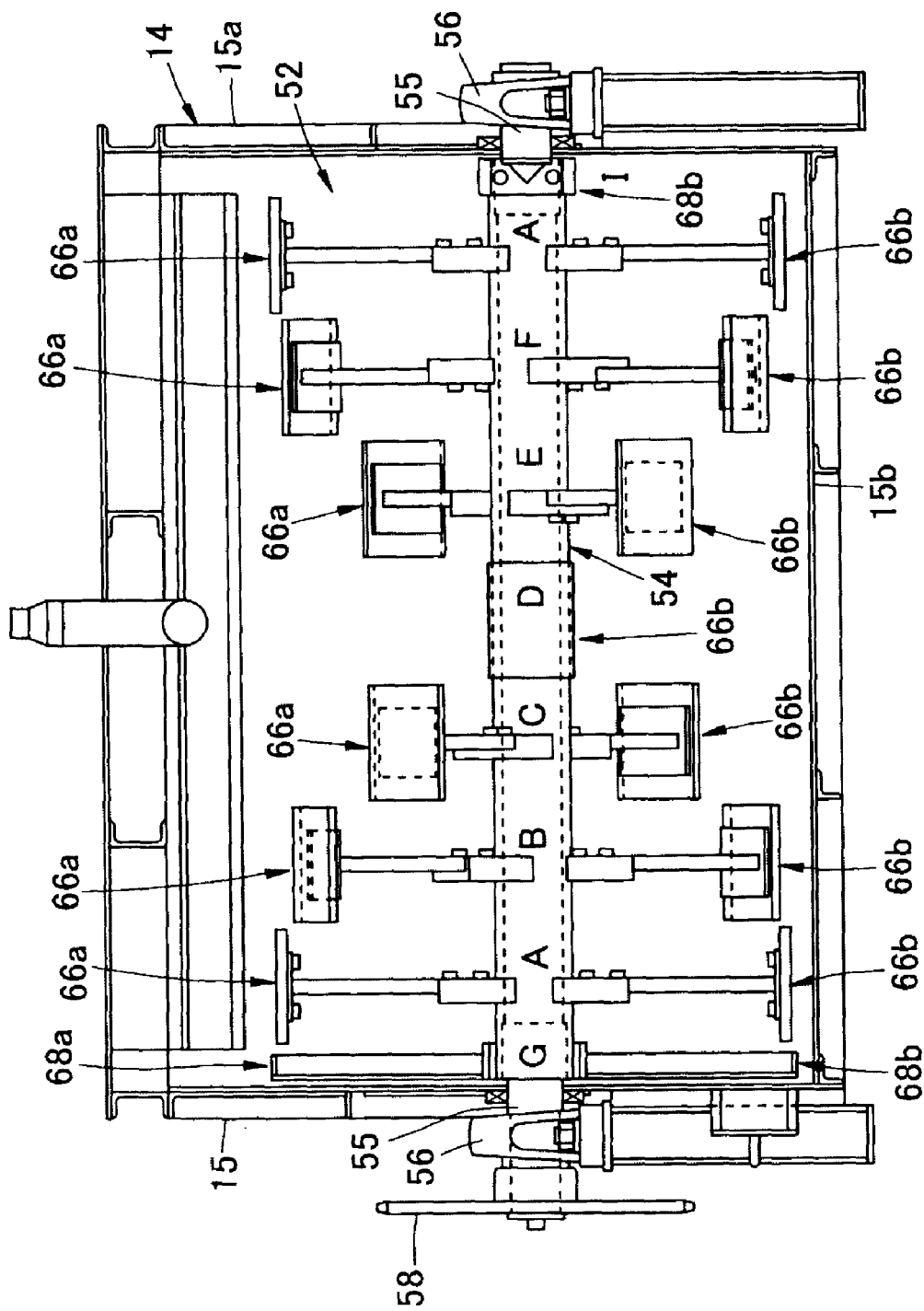
FIG. 11 is a front view illustrating an example of agitation device (an agitator) applied to the waste treatment apparatus according to the present invention and also illustrating the periphery thereof.
Figure 12:
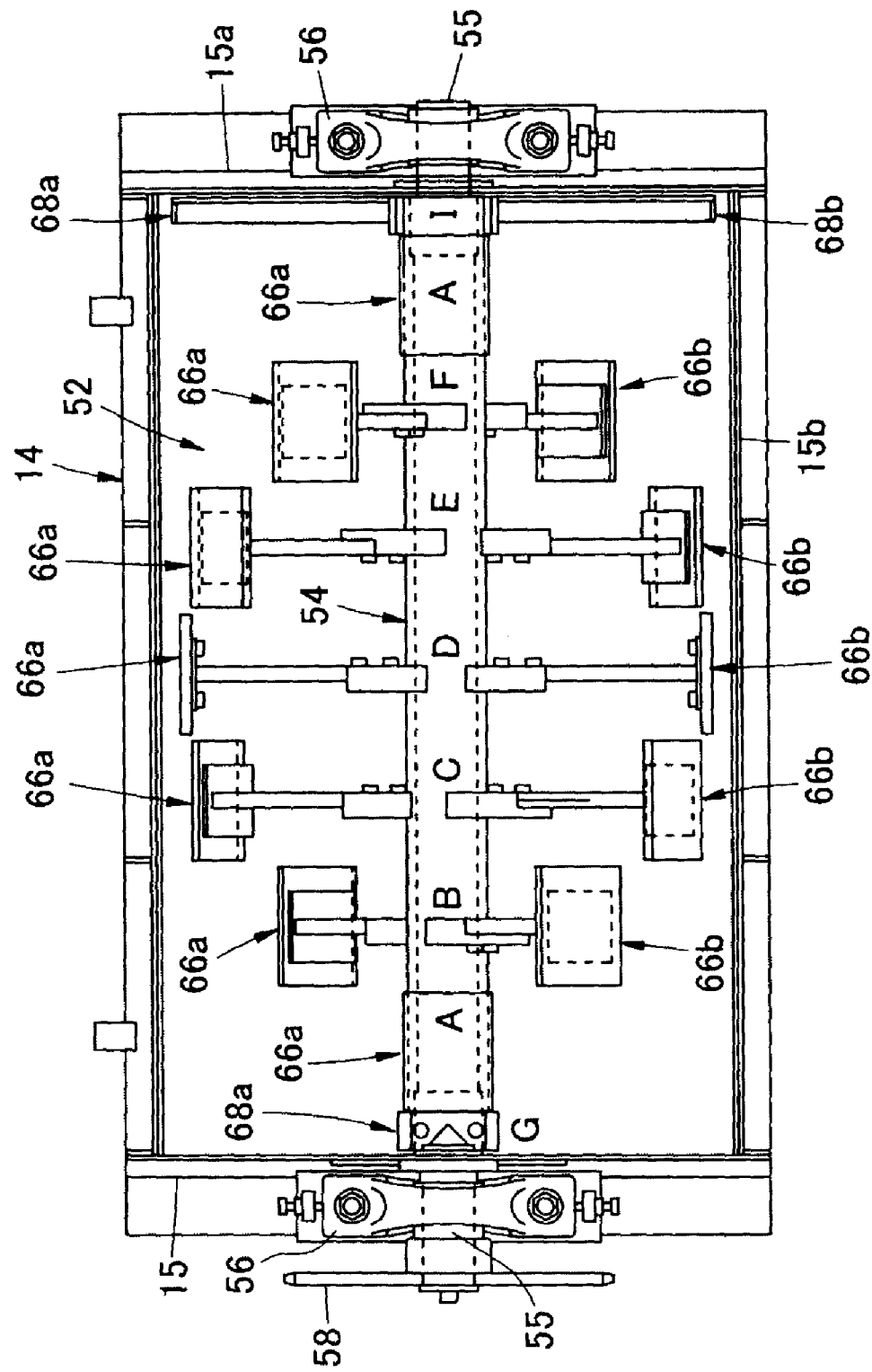
FIG. 12 is a plan view illustrating the example of the agitation device (the agitator) applied to the waste treatment apparatus according to the present invention and also illustrating the periphery thereof.
Figure 13:
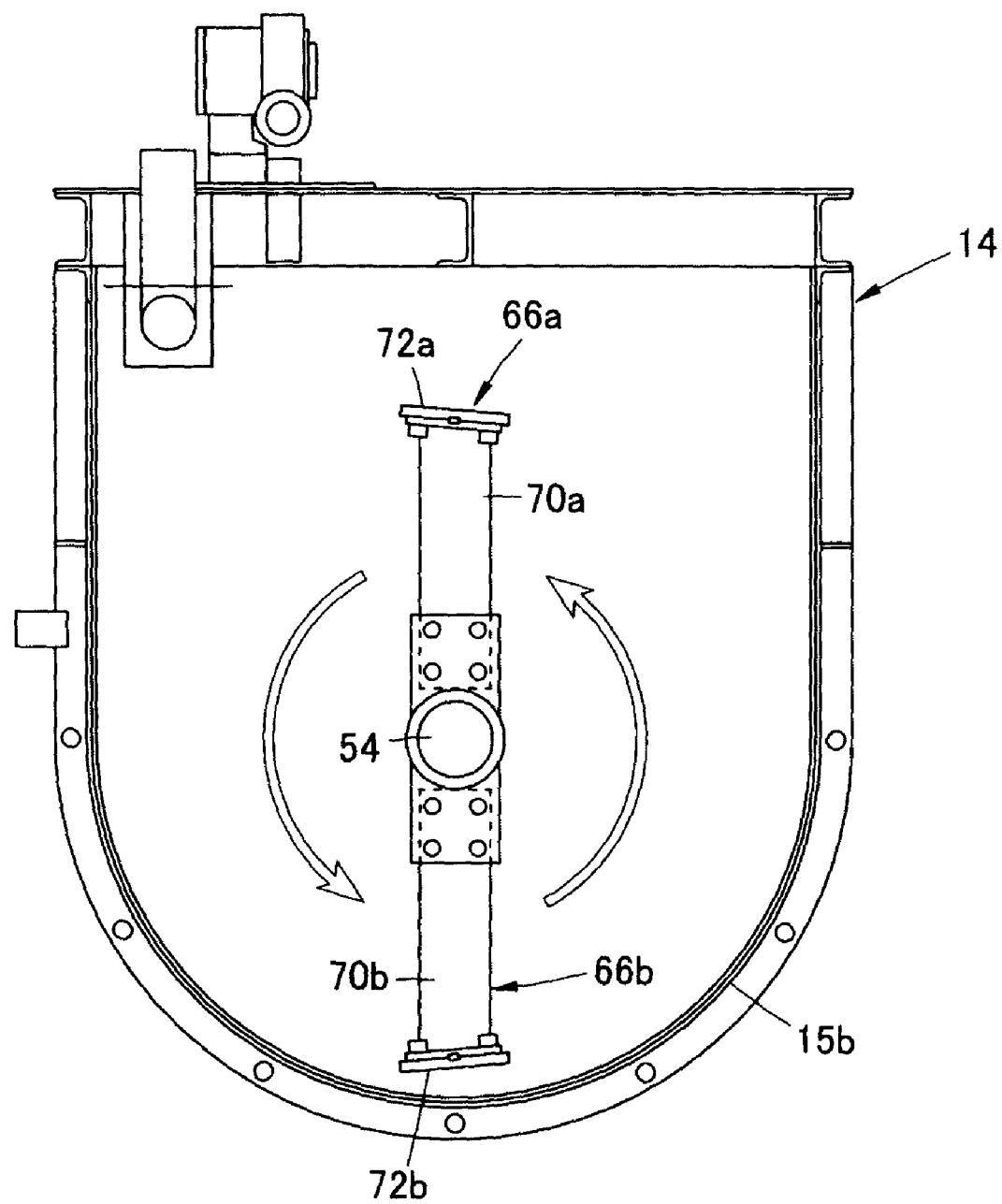
FIG. 13 is a left side view of agitating tools in A illustrated in FIGS. 11 and 12, viewed from the left side of the treatment tank.
Figure 14:
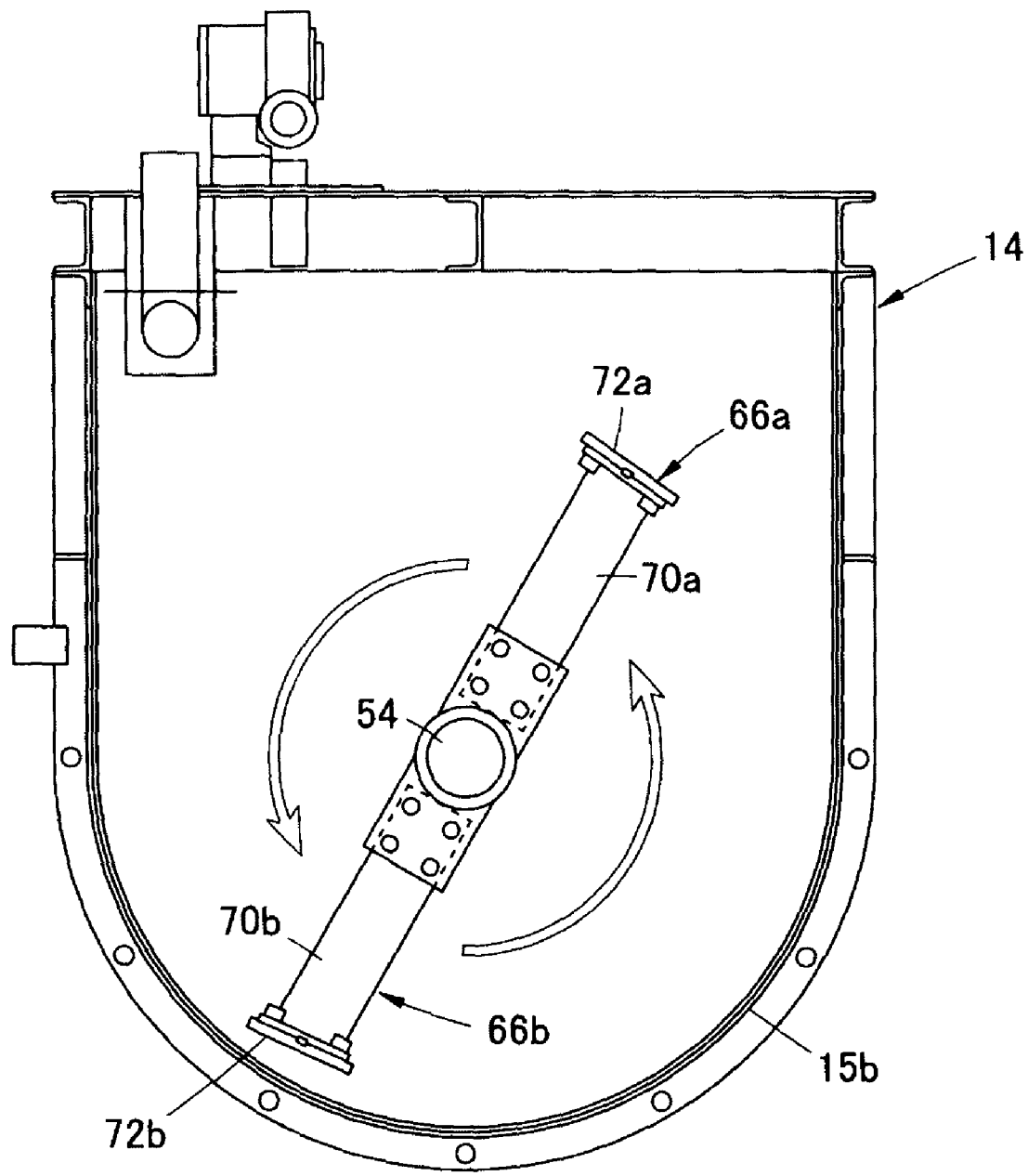
FIG. 14 is a left side view of agitating tools in B illustrated in FIGS. 11 and 12, viewed from the left side of the treatment tank.
Figure 15:
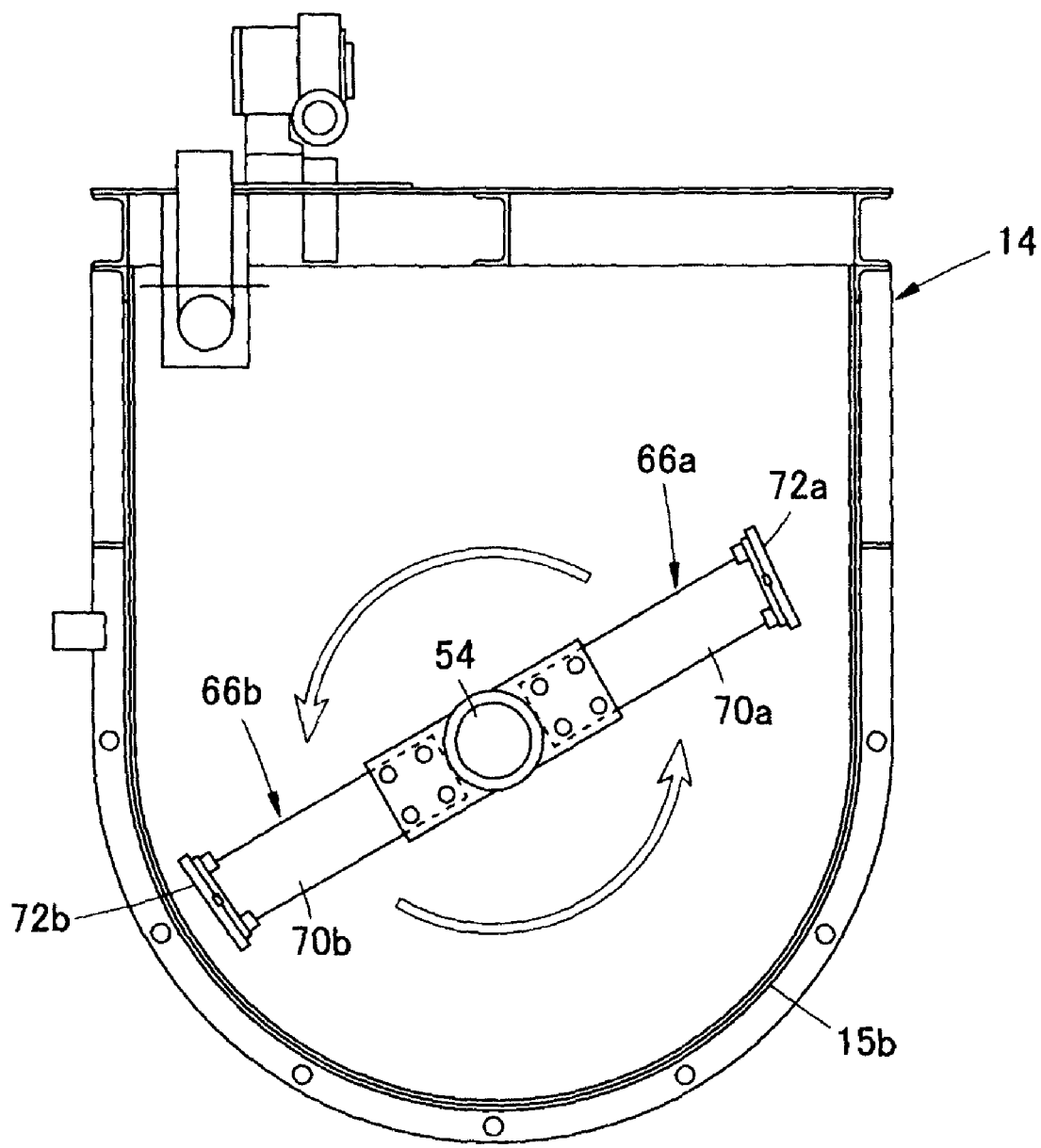
FIG. 15 is a left side view of agitating tools in C illustrated in FIGS. 11 and 12, viewed from the left side of the treatment tank.
Figure 16:
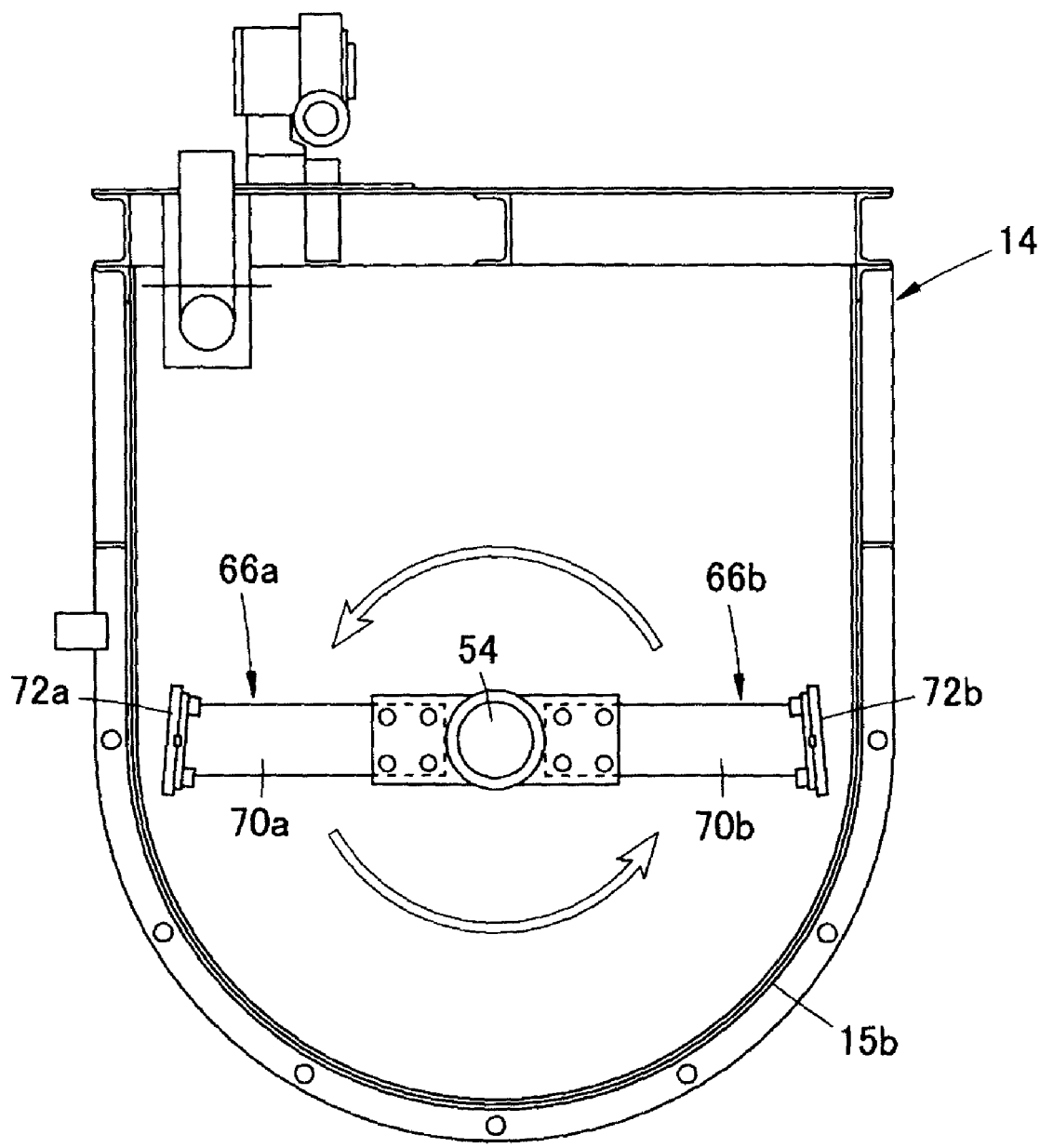
FIG. 16 is a left side view of agitating tools in D illustrated in FIGS. 11 and 12, viewed from the left side of the treatment tank.
Figure 17:
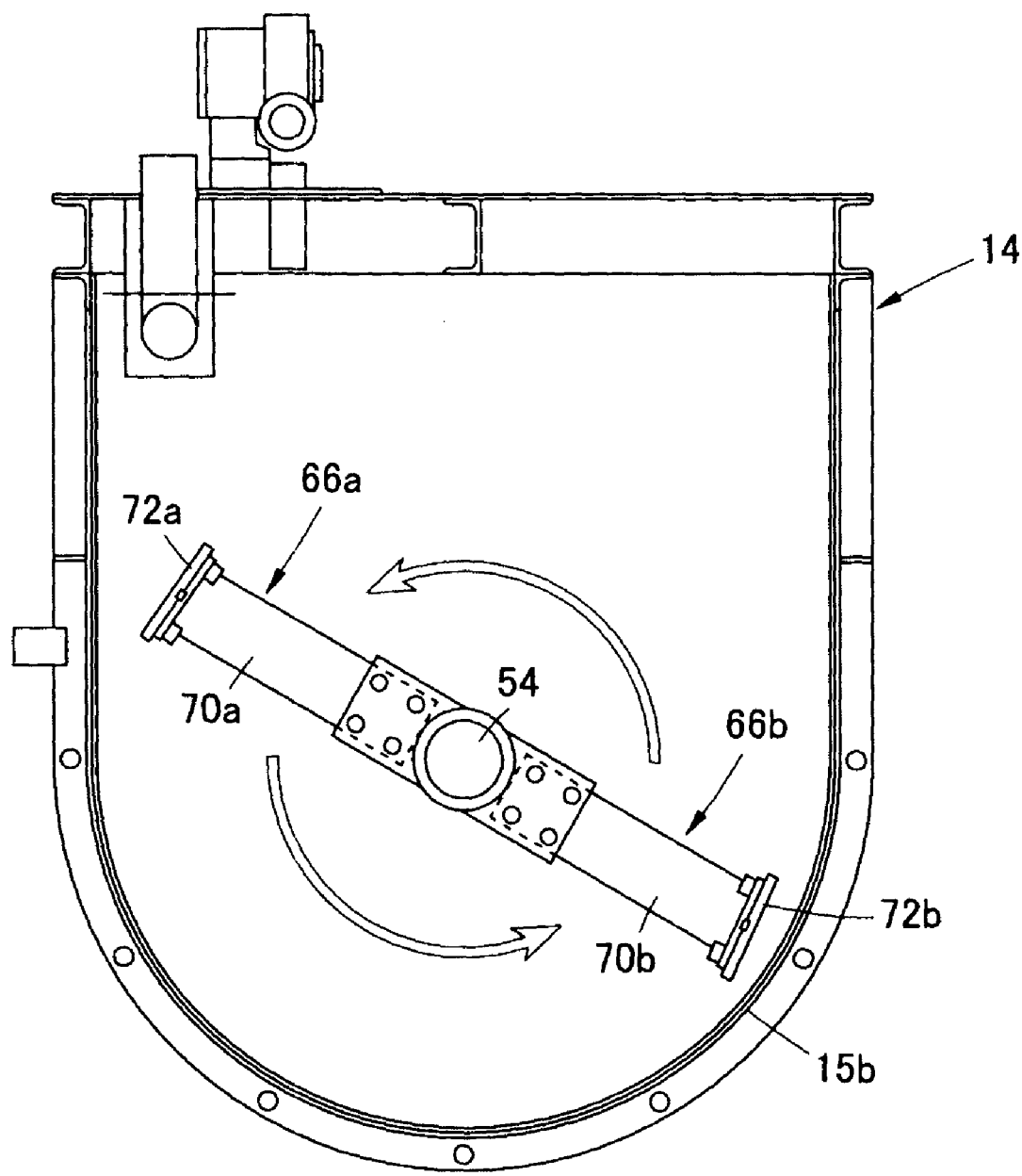
FIG. 17 is a left side view of agitating tools in E illustrated in FIGS. 11 and 12, viewed from the left side of the treatment tank.
Figure 18:
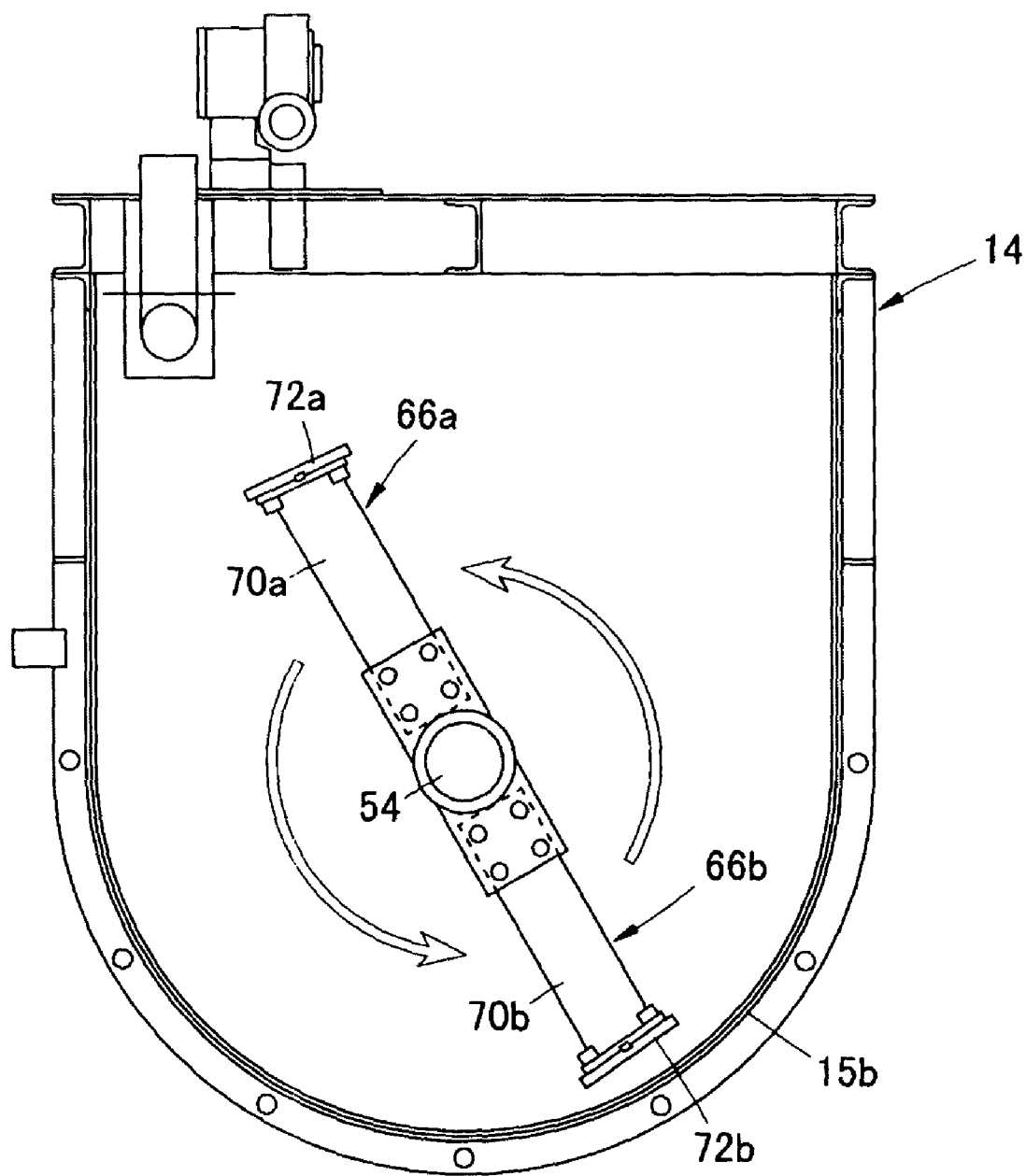
FIG. 18 is a left side view of agitating tools in F illustrated in FIGS. 11 and 12, viewed from the left side of the treatment tank.
Figure 19:
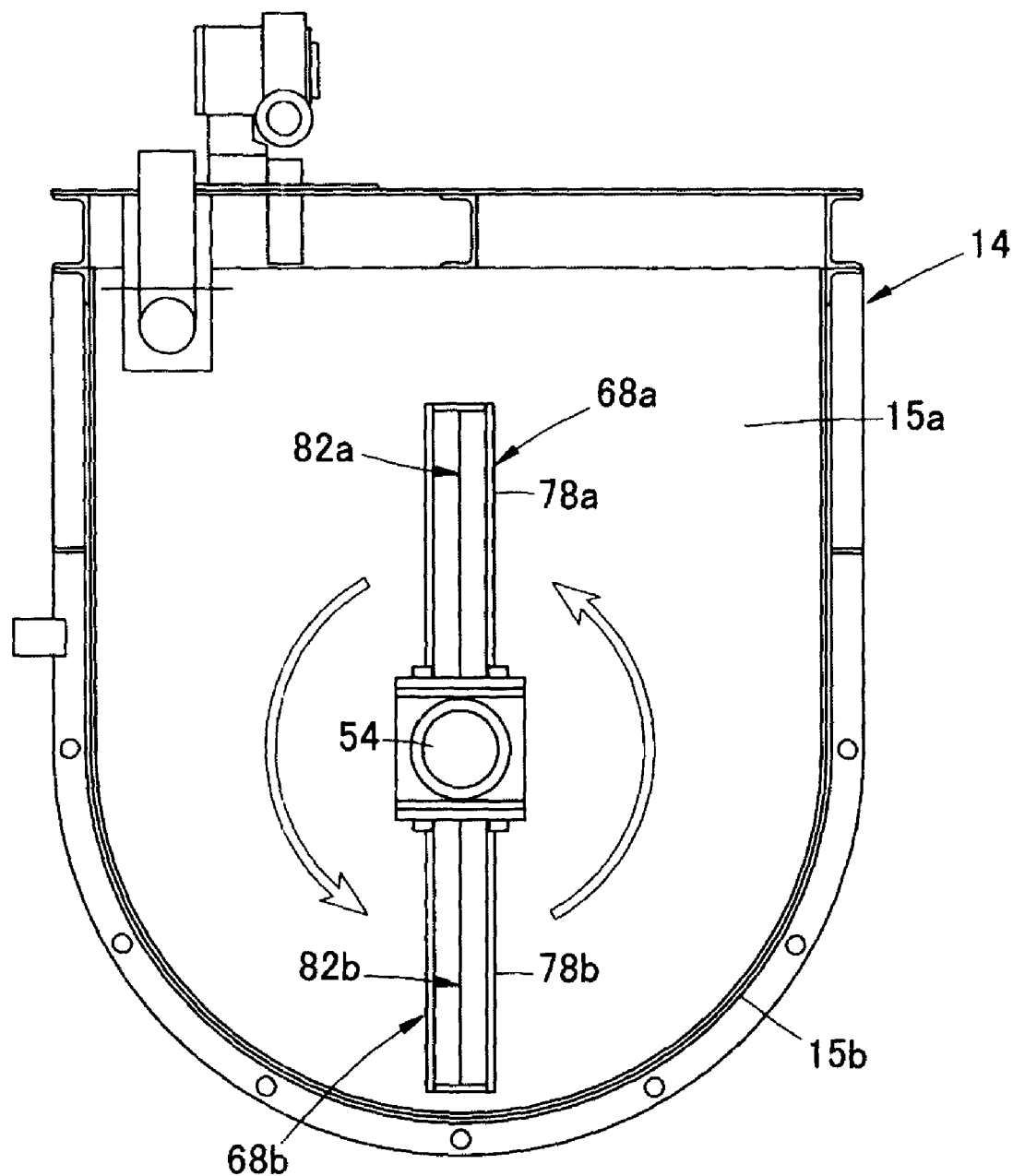
FIG. 19 is a left side view of agitating tools in G illustrated in FIGS. 11 and 12, viewed from the left side of the treatment tank.
Figure 20:
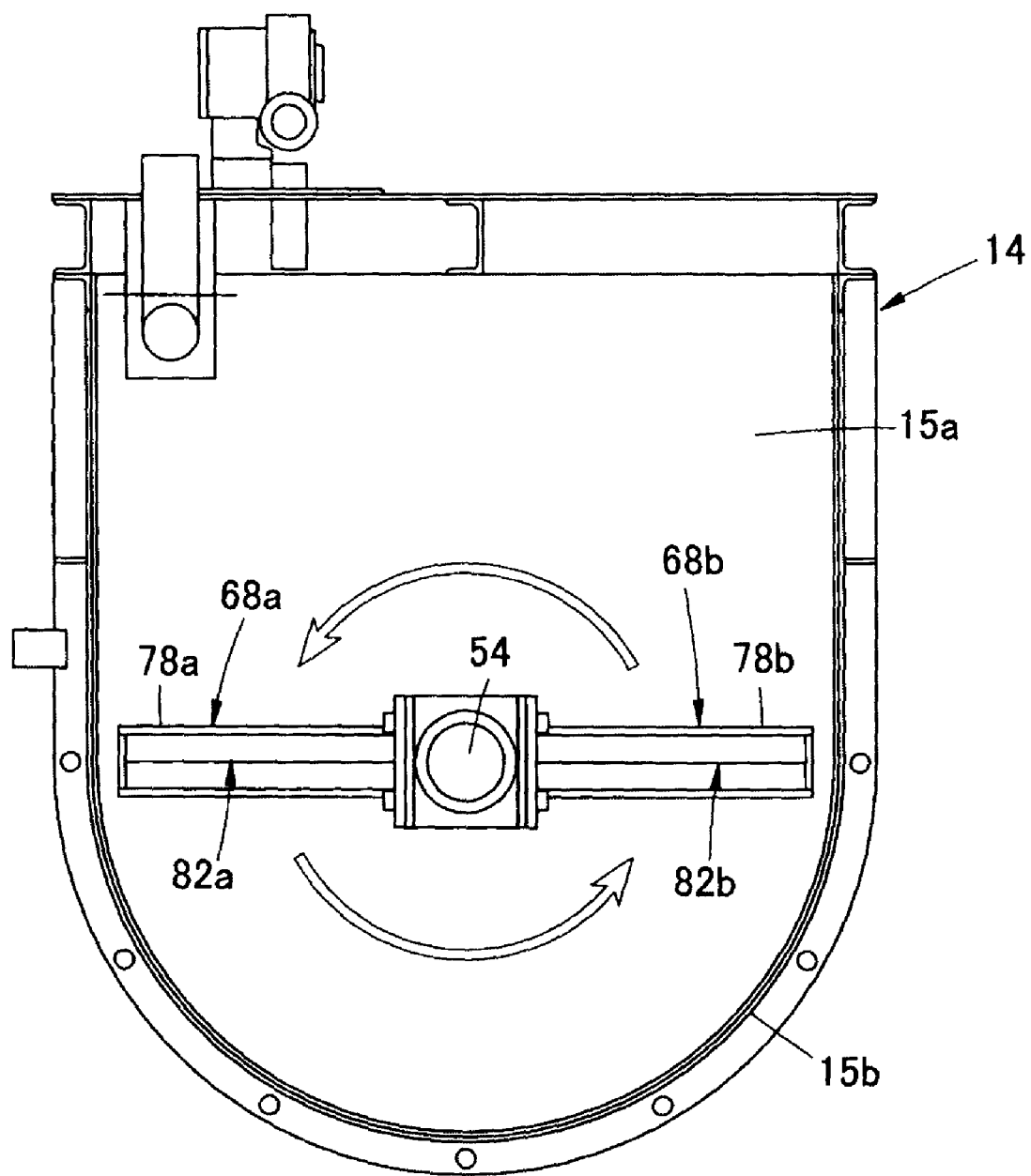
FIG. 20 is a left side view of agitating tools in I illustrated in FIGS. 11 and 12, viewed from the left side of the treatment tank.

That is, as shown in, for example, FIGS. 11 and 12, the agitation device 18 includes an agitator 52, and the agitator 52 includes a rotation shaft 54 disposed near the center in the lengthwise direction of the treatment tank 14. A connection shaft 55 is provided in each of two axial end portions of the rotation shaft 54. The connection shaft 55 is rotatably supported by a bearing portion 56 which is provided on the outer wall side of side panels 15a positioned on respective lengthwise sides of the treatment tank 14. Furthermore, as shown in FIGS. 6, 7, 11, and 12, a sprocket 58 is attached to the end portion of the connection shaft 55. Moreover, as shown in, for example, FIGS. 6 and 7, for example, a gear motor 60 defining a driving device arranged to drive the rotation shaft 54 is provided on the rear side of the treatment tank 14. A sprocket 62 is attached to a driving shaft of the gear motor 60, and a roller chain 64 is stretched between the sprocket 58 and the sprocket 62.

As shown in FIGS. 11 and 12, a plurality of pairs of agitating tools 66a and 66b are fixed in an axial midway portion of the rotation shaft 54 so as to be arranged at predetermined intervals in the axial direction of the rotation shaft 54 (for example, seven pairs (A, B, C, D, E, F, and A) of the agitating tools 66a and 66b are illustrated in FIGS. 11 and 12). In addition, in each of two axial end portions of the rotation shaft 54, another pair of agitating tools 68a and 68b is disposed and fixed on the inner wall side of the side panels 15a of the treatment tank 14 (for example, two pairs (G and I) of the agitating tools 68a and 68b are illustrated in FIGS. 11 and 12).

In this case, the seven pairs of the agitating tools 66a and 66b are arranged so as to be shifted by a phase difference of, for example, 30° in the rotation direction of the rotation shaft 54. The other two pairs of the agitating tools 68a and 68b are arranged such that the phase difference in the rotation direction of the rotation shaft 54 is, for example, 90°.

First, a description is given of a pair of the agitating tools 66a and 66b. The pair of agitating tools 66a and 66b includes a pair of paddle arms 70a and 70b which are disposed so as to be opposed to each other in the diameter direction of the rotation shaft 54. That is, the agitating tool 66a on one side and the agitating tool 66b on the other side are disposed about the center of the central axis of the rotation shaft 54 so as to be opposed to each other by about 180°. Therefore, as for the pair of agitating tools 66a and 66b, the agitating tool 66b on the other side rotates in the same rotational trajectory as that of the agitating tool 66a on the one side.

Figure 21:
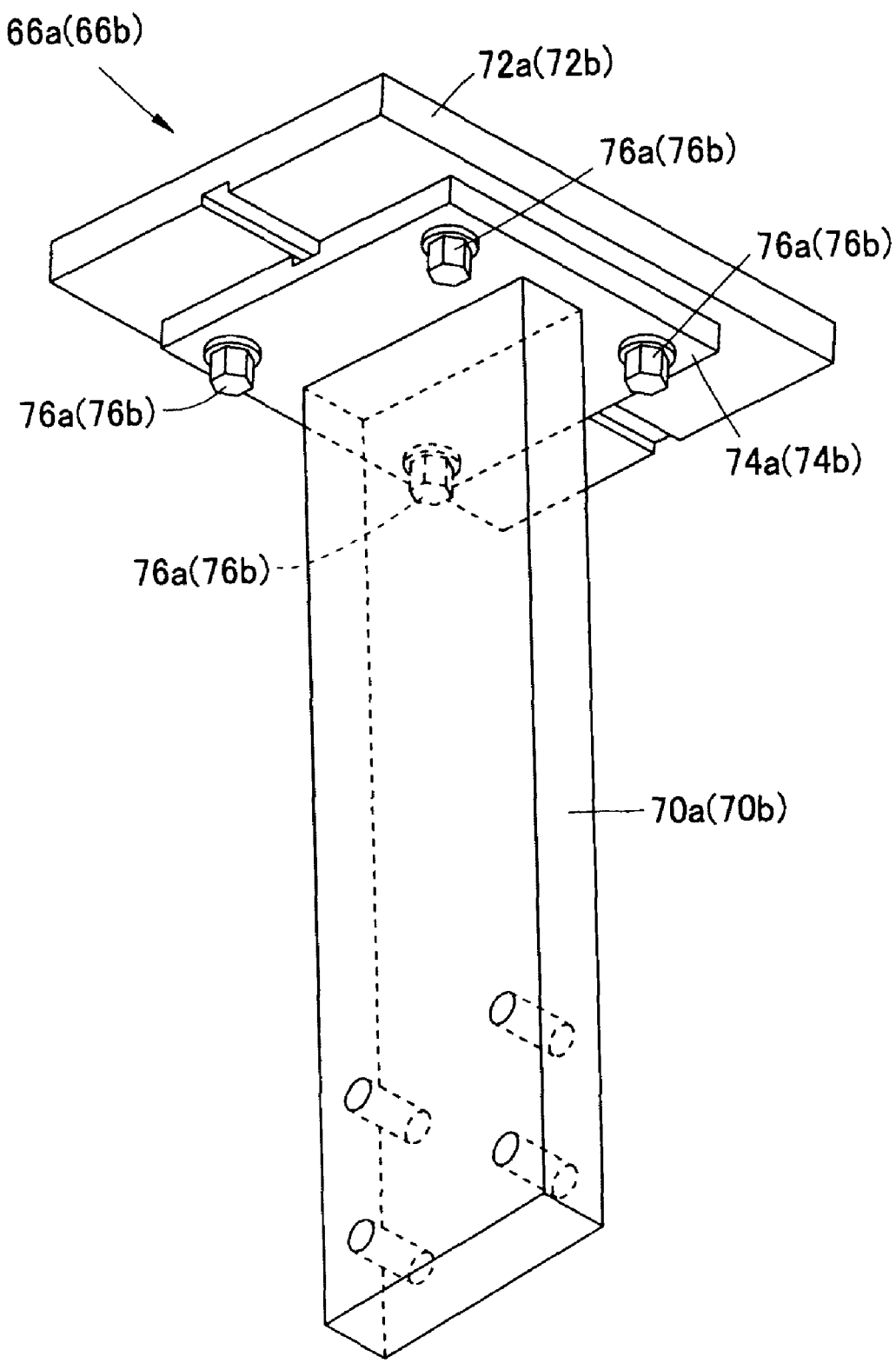
FIG. 21 is a perspective view illustrating the agitating tool in A to F illustrated in FIGS. 11 and 12.

Each of the paddle arms 70a and 70b in a pair is formed into, for example, a generally rectangular plate-like shape as shown in FIG. 21. As shown in, for example, FIGS. 13 to 18, 23(a) and (b), each of the paddle arms 70a and 70b in a pair is disposed so as to be separated from the inner wall of a body panel 15b of the treatment tank 14 by a predetermined distance.

Figure 23:
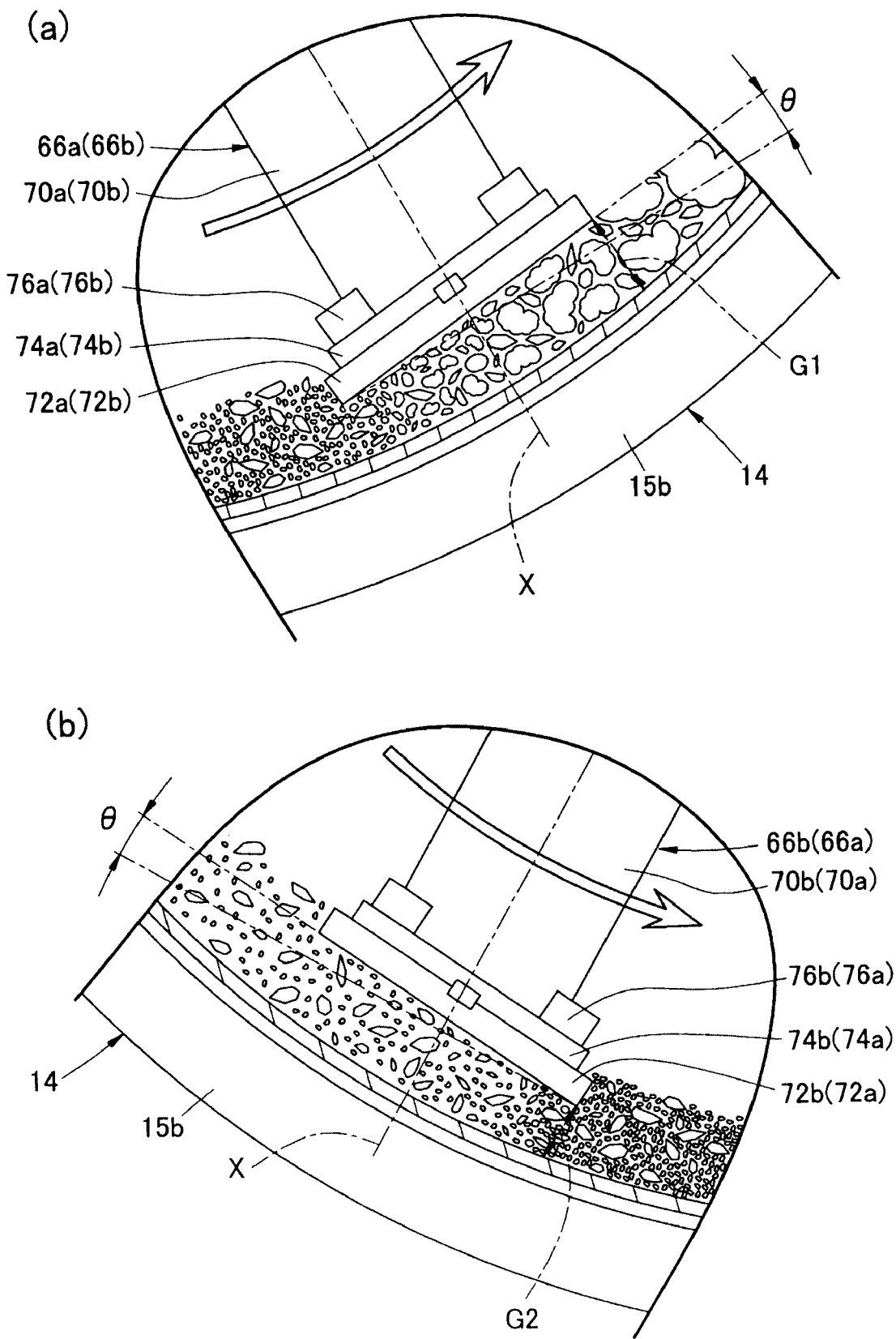
FIGS. 23(a) and (b) are a set of views showing the essential portions and illustrating typical agitation action by the agitating tool in A to F in FIGS. 11 and 12, FIG. 23(a) being a view showing the essential portions and illustrating agitation action by one paddle arm and a blade, FIG. 23(b) being a view showing the essential portions and illustrating agitation action by the other paddle arm and a blade.

Furthermore, as shown in FIGS. 23(a) and (b), blades 72a and 72b having, for example, a rectangular plate-like shape are disposed in their respective lengthwise end portions of a pair of paddle arms 70a and 70b so as to be inclined at a predetermined angle θ with respect to an axis X of the paddle arms 70a and 70b. Moreover, as shown in FIG. 21, connection plates 74a and 74b are disposed between the paddle arm 70a and the blade 72a and between the paddle arm 70b and the blade 72b, respectively, for connecting them. The paddle arms 70a and 70b are integrally connected to the connection plates 74a and 74b, respectively, by a fixing element, such as welding. The connection plates 74a and 74b are fastened and fixed to 72a and 72b, respectively, by fasteners 76a and 76b, such as a bolt.

As shown in FIGS. 13 to 18, 23(a) and (b), as for the pair of agitating tools 66a and 66b, the blade 72a on one side is disposed so as to be inclined forward in a direction in which the front side of the blade 72a with respect to the rotation direction of the pair of paddle arms 70a and 70b approaches the rotation shaft 54. On the other hand, the blade 72b on the other side is disposed so as to be inclined backward in a direction in which the rear side of the blade 72b with respect to the rotation direction of the pair of paddle arms 70a and 70b approaches the rotation shaft 54. In this case, the blades 72a and 72b of the pair of paddle arms 70a and 70b are provided such that the front end portion of the blade 72a on the one side is separated from the inner wall of the body panel 15b of the treatment tank 14 by a distance G1 of, for example, about 30 mm, and that the front end portion of the blade 72b on the other side is separated from the inner wall of the body panel 15b of the treatment tank 14 by a distance G2 of, for example, about 25 mm.

According to experiments by the present inventor, it is preferable that G1 be set to about 30 mm and G2 be set to about 25 mm when the thickness of the support material (hereinafter referred to as a fungus bed) which adheres to the inner wall of the treatment tank 14 and is stacked thereon is about 30 mm. Furthermore, it has been found that G1 may be set within the range of, for example, about 30 to about 45 mm and, correspondingly, G2 may be set within the range of, for example, about 25 to about 45 mm, depending on the thickness of the fungus bed. However, when G1 exceeds about 50 mm, or the thickness of the fungus bed exceeds about 50 mm, a function of grinding by pressing against the fungus bed side is not effectively exerted.

When the pair of agitating tools 66a and 66b rotates, the waste (materials to be treated) is ground by the blade 72a of the paddle arm 70a on one side while being pressed against the side of the fungus bed having a predetermined thickness (for example, a thickness of about 30 mm) as shown in, for example, FIG. 23(a). In this case, since the fungus bed contains sharp crushed pieces (pulverized pieces) composed of sintered porous materials such as tile, brick, and ceramic, a sharp portion of the crushed pieces composed of the sintered porous materials acts as a crushing blade, and thus the waste (materials to be treated) can be crushed and ground efficiently and effectively.

Furthermore, after the rotating paddle arm 70a on the one side passes through, the front end portion of the blade 72b of the rotating paddle arm 70b on the other side coming thereafter scrapes a layer of a predetermined thickness (for example, 5 mm) from a layer of the fungus bed and the waste (materials to be treated), as shown in FIG. 23(b). Here, since the layer of the fungus bed and the waste (materials to be treated) contains about 60% or less of moisture and is in a relatively dry state, the scraping is easily performed.

Hence, in this waste treatment apparatus 10, the load on the blade 72a of the rotating paddle arm 70a coming thereafter is reduced, and thus the subsequent grinding action can be efficiently exerted without resistance. Furthermore, since the agitating tools 66a and 66b in each of the plurality of pairs have the grinding function and the scraping and stripping function, respectively, the load on each of the blades 72a and 72b and on each of the paddle arm 70a and 70b is reduced. Therefore, each of the paddle arm 70a and 70b is less likely to be bent under the load.

The scraped pieces of the waste and the fungus bed fall to the bottom side of the treatment tank 14 and are again agitated by the agitating tools 66a and 66b. Then, by the decomposition action of the aerobic microorganisms, the volume of the waste is reduced, and the waste is annihilated. Furthermore, the fungus bed and the waste (materials to be treated) stick and adhere to the inner wall of the treatment tank 14 when the moisture content is high. However, as the inside of the treatment tank 14 is heated and dried, the fungus bed and the waste (materials to be treated) flake off, are again agitated by each of the agitating tools 66a and 66b, and are subjected to the decomposition treatment by the microorganisms.

According to experiments by the present inventor, the inclination angle θ of the blades 72a and 72b with respect to the paddle arms 70a and 70b, respectively, is set preferably within the range of about 1° to about 15°, more preferably within the range of about 4° to about 6°. When the inclination angle θ of the blades 72a and 72b exceeds about 15°, the blades 72a and 72b merely press the waste and the fungus bed, and thus the grinding function is not effectively exerted. In this case, the blade 72b scrapes the entire layer of the waste and the fungus bed having adhered to and having been stacked on the bottom surface of the treatment tank 14 (the inner wall of the body panel 15b). Thus, the bottom surface of the treatment tank 14 (the inner wall of the body panel 15b) is exposed. Therefore, subsequent grinding by the blade 72a caused by the rotation of the paddle arm 70a is not effective.

Figure 22:
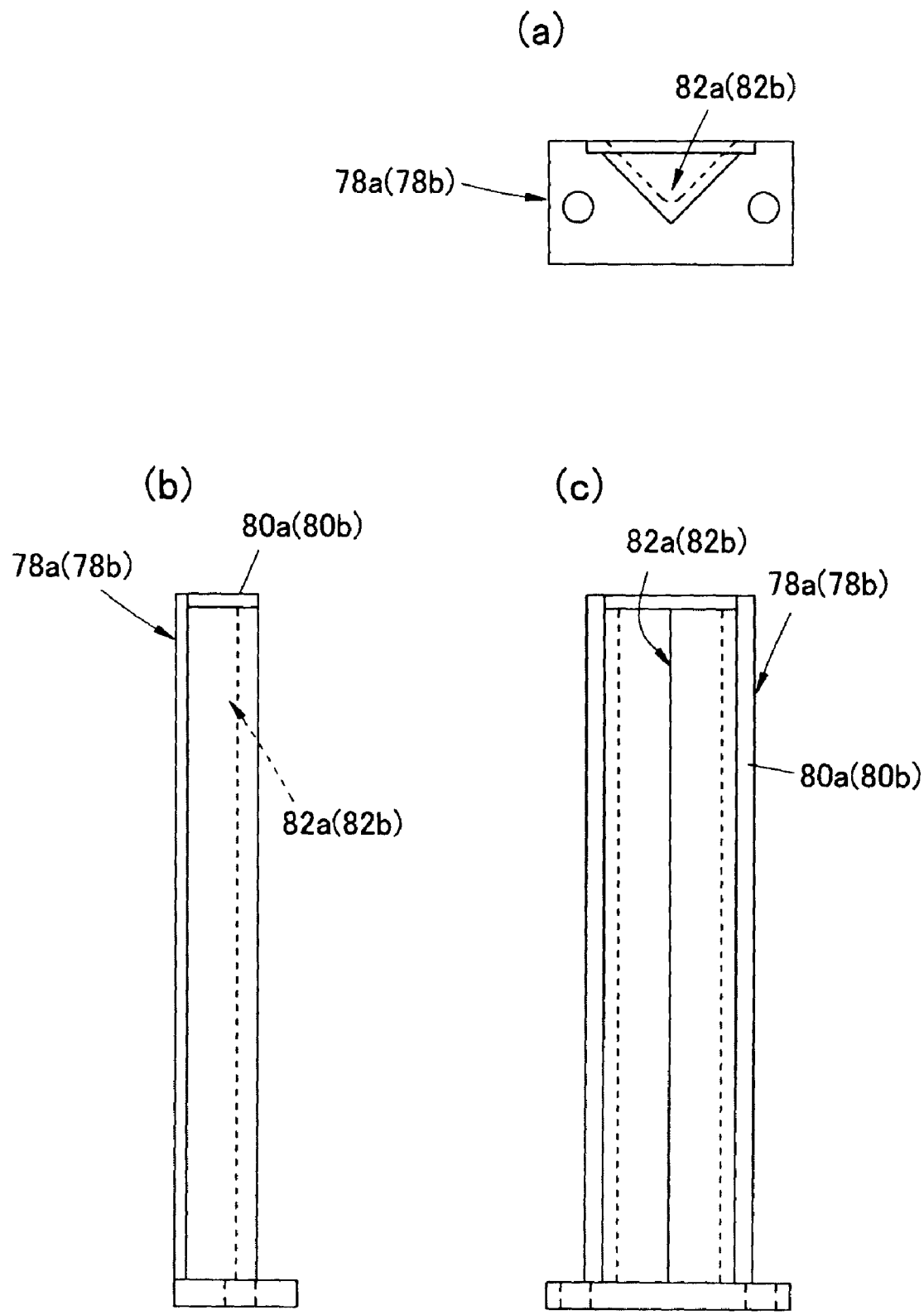
FIG. 22(a) is a plan view of the agitating tool in G and I illustrated in FIGS. 11 and 12.
FIG. 22(b) is a left side view of the agitating tool in I illustrated in FIGS. 11 and 12.
FIG. 22(c) is a front view of the agitating tool in I illustrated in FIGS. 11 and 12.

Next, a description is given of the other two pairs of the agitating tools 68a and 68b provided on the inner wall side of the respective side panels 15a of the treatment tank 14, with reference to FIGS. 11, 12, 19, 20, and 22(a)-(c). As in the above pair of agitating tools 66a and 66b, each of the pairs of the agitating tools 68a and 68b includes a pair of paddle arms 78a and 78b disposed so as to be opposed to each other in the diameter direction of the rotation shaft 54, as shown in, for example, FIGS. 19 and 20. The paddle arms 78a and 78b in the pairs include generally rectangular plate-like arm bodies 80a and 80b, respectively, as shown in FIGS. 22(a), (b), and (c). The arm bodies 80a and 80b have groove portions 82a and 82b, respectively, each having, for example, a V-shaped cross-section and each provided in one principal plane side thereof. As shown in, for example, FIGS. 11, 12, 19 and 20, the paddle arms 78a and 78b in the pairs are disposed such that the respective lengthwise end portions thereof are separated from the inner wall of the body panel 15b of the treatment tank 14 by a predetermined distance.

The two pairs of the agitating tools 68a and 68b are provided in order to prevent the waste and the fungus bed from sticking to the inner wall of the respective two lengthwise side panels 15a of the treatment tank 14.

The decomposition action of the aerobic microorganisms on the waste in the treatment tank 14 is further activated by co-operative action of the above activation device 16 and the above agitation device 18. The exhaust gas, such as carbon dioxide (carbonic acid gas) and water vapor, generated in the treatment tank 14 is discharged from the treatment tank 14 through the exhaust device 20. As the exhaust device 20, a blower such as Ring Blow (a trade name) is used.

Figure 24:
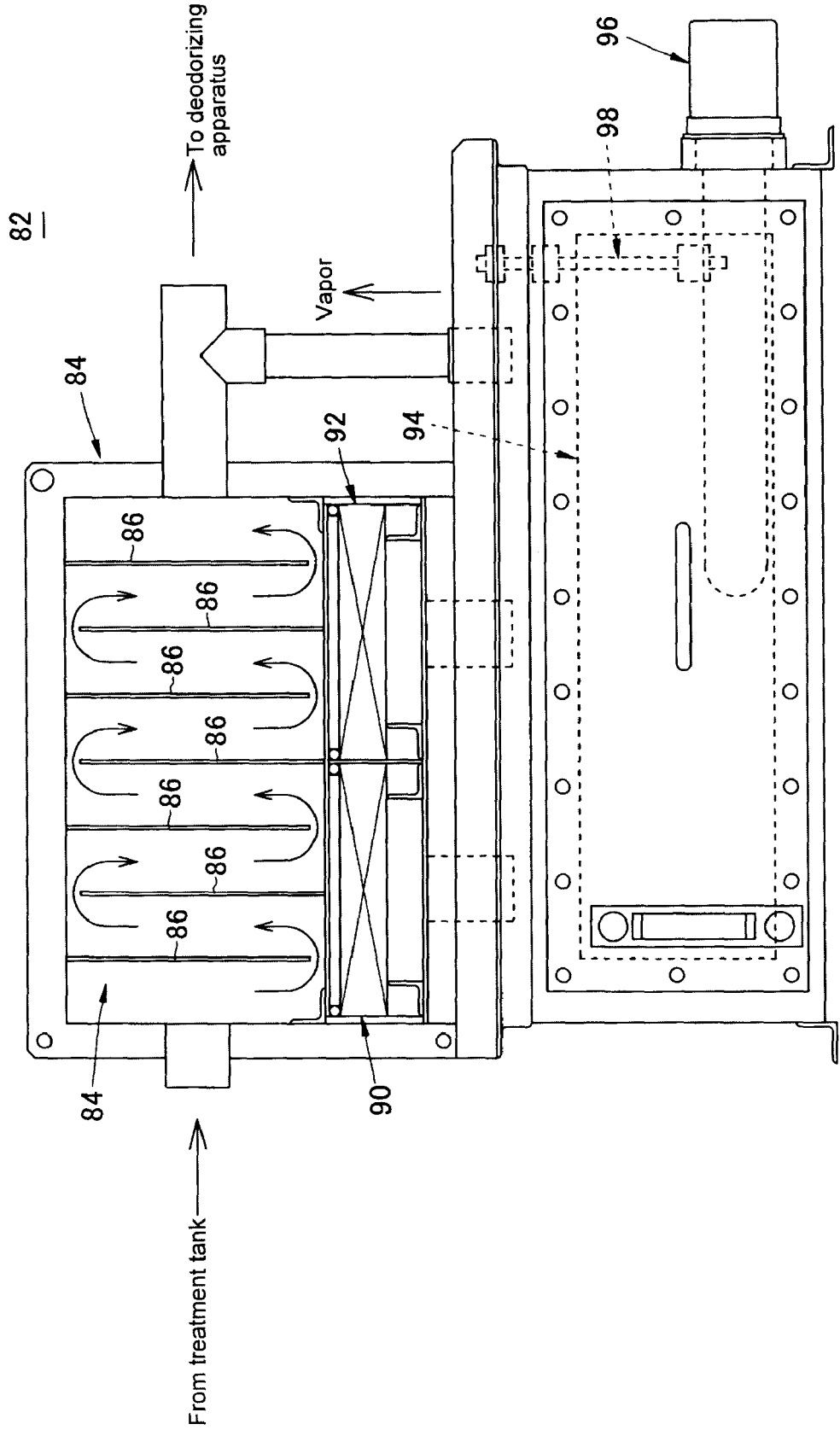
FIG. 24 is a front view illustrating an example of a dust removal apparatus applied to the waste treatment apparatus according to the present invention.
Figure 25:
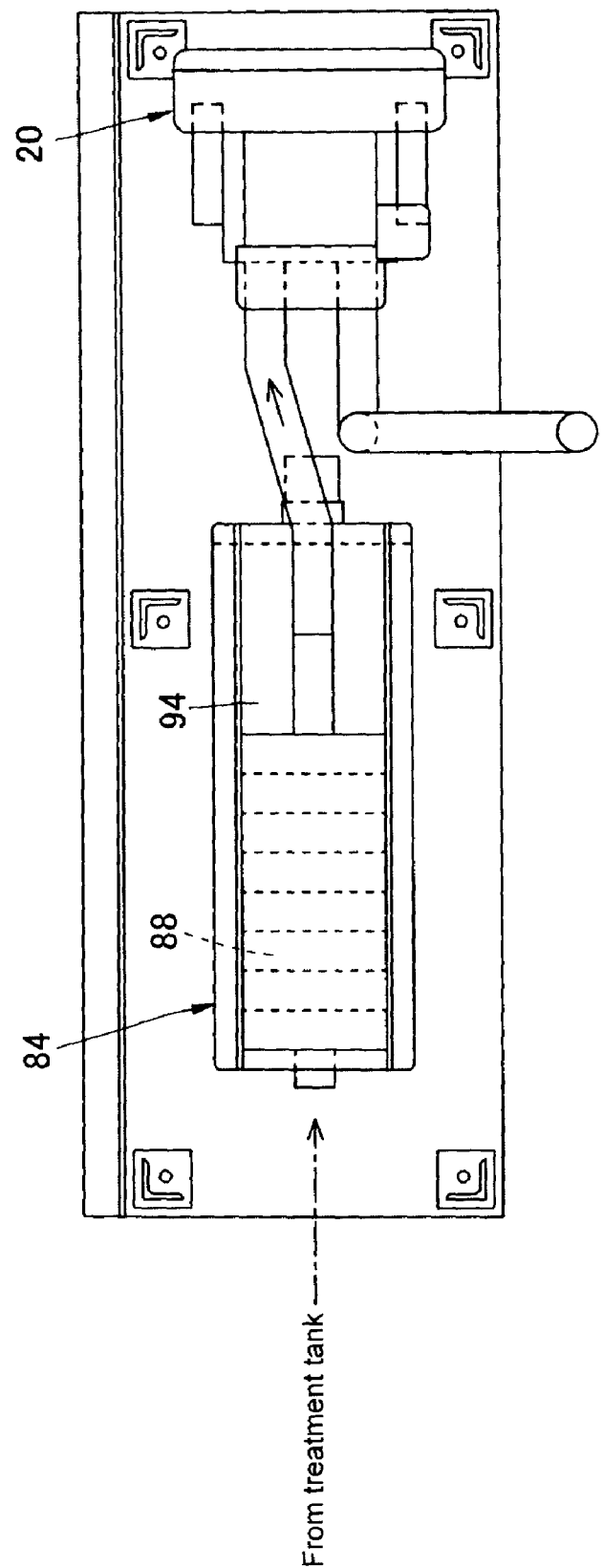
FIG. 25 is a view on arrow, taken along a line A-A in FIG. 7.

Next, with reference to FIGS. 1, 5, 7, 24, and 25, a description is given of the dust removal device 22 which removes dust from the exhaust gas discharged from the treatment tank 14 through the exhaust device 20 and evaporates moisture contained in the exhaust gas. The dust removal device 22 includes a dust remover 84, and the dust remover 84 includes a dust removal unit 88 having a plurality of shielding plates 86 made of, for example, stainless steel. The plurality of shielding plates 86 are arranged in a staggered manner as shown in FIG. 24.

Filter units 90 and 92 are provided below the dust removal unit 88. Provided below the filter units 90 and 92 is a drainage tank 94 which stores moisture (hereinafter referred to as drainage) in the exhaust gas after the dust in the exhaust gas is removed through the dust removal unit 88 and the filter units 90 and 92. The drainage in the drainage tank 94 is heated by a heater 96 and is thus evaporated, and the vapor thereof is discharged to the deodorization device 24 described later through the exhaust device 20.

Furthermore, a liquid level detection device 98 such as a float type level sensor is disposed in the drainage tank 94. The liquid level detection device 98 is provided to prevent the drainage tank 94 from being accidentally heated by the heater 96 when the level of the drainage in the drainage tank 94 is lower than a predetermined level.

Figure 26:
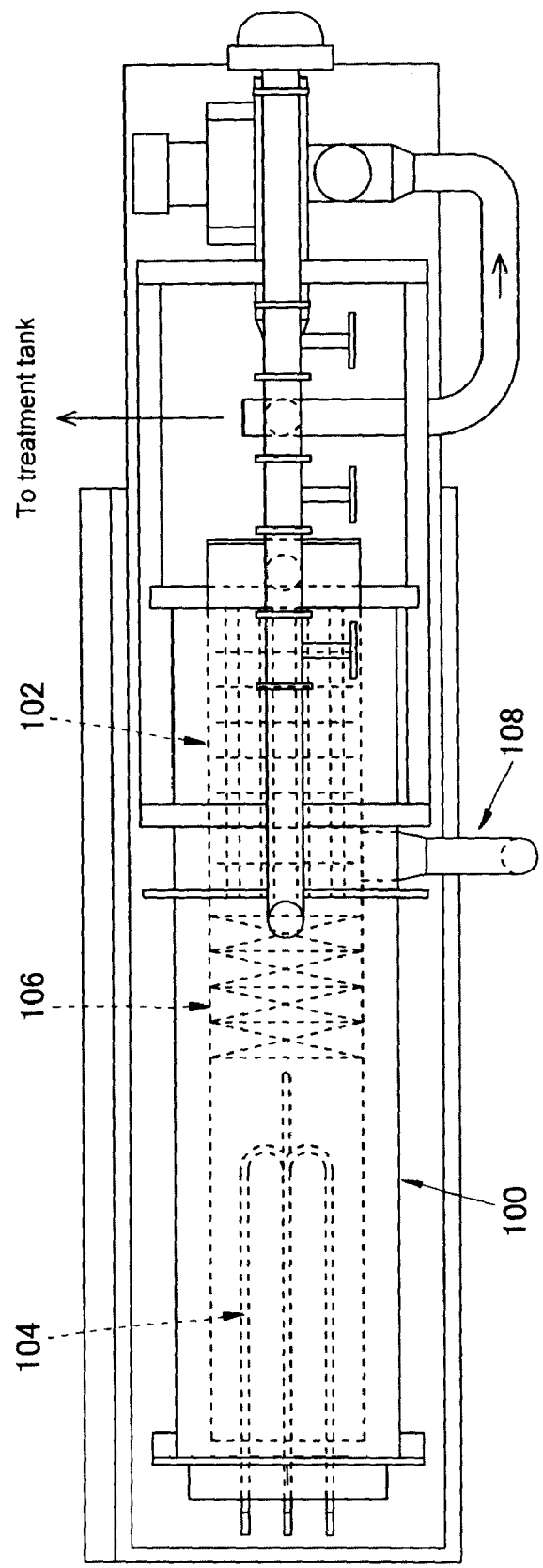
FIG. 26 is a view on arrow, taken along a line B-B in FIG. 7.

Next, with reference to FIGS. 5, 7, and 26, a description is given of the deodorization device 24 which performs deodorization treatment of removing foul odors in the exhaust gas treated by the dust remover 84 by heating the exhaust gas at a high temperature (for example, about 250° C.). The deodorization device 24 includes a deodorizing apparatus 100 which removes foul odors by, for example, a catalytic combustion method. As shown in FIG. 26, the deodorizing apparatus 100 is provided with a preheating unit 102 having a heat exchanger (not shown), a heating unit 104 having a heater, and a catalyst unit 106 including a metal honeycomb catalyst. In this case, the exhaust gas treated in the dust remover 84 is circulated through a circulation path 108 which connects the preheating unit 102, the heating unit 104 and the catalyst unit 106.

The exhaust gas containing vapor of the drainage discharged from the dust remover 84 is preheated by the preheating unit 102, is heated by the heating unit 104 to a high temperature, and then passes through the catalyst unit 106. At this time, foul odor components in the exhaust gas are absorbed by the metal honeycomb catalyst in the catalyst unit 106 and heated at a high temperature, and thus the foul odors are removed. The deodorized air (the exhaust gas) again passes the preheating unit 102 and is sent to the inlet pipe 40a attached to the passage inlet portion 40 of the jacket portion 38 of the treatment tank 14. In this deodorizing apparatus 100, the exhaust gas sent to the deodorizing apparatus 100 is preheated by the preheating unit 102. In this case, the exhaust gas temperature around an outlet of the deodorizing apparatus 100 is, for example, about 140° C. Therefore, the heater of the heating unit 104 may be stopped according to the preheat amount. Thus, the power consumption amount of the heater of the heating unit 104 can be reduced, and thus electric power cost when the heater is operated is reduced.

The waste treatment apparatus 10 according to this preferred embodiment includes the assisting device 26 which assists heating and warming of the treatment tank 14 by utilizing the heat of the air (exhaust-heat gas) heated and deodorized by the deodorizing apparatus 100. The assisting device 26 includes a passage 110 which connects the deodorizing apparatus 100 and the jacket portion 38 of the treatment tank 14. That is, as shown in, for example, FIG. 1, the passage 110 made of appropriate piping is disposed between the deodorizing apparatus 100 and the jacket portion 38 of the treatment tank 14. For example, a heat resistant electric blower 112 is provided on the route of the passage 110, and the exhaust-heat gas treated by the deodorizing apparatus 100 is supplied to the inlet pipe 40a of the jacket portion 38 through the heat resistant electric blower 112.

Furthermore, a portion of the exhaust-heat gas inhaled and discharged from the deodorizing apparatus 100 is discharged to the atmosphere via branch passages 114 and 116 branched from the passage 110. In addition, the atmosphere can be appropriately introduced through a branch passage 118 branched from the passage 110 as appropriate. The damper D1 is disposed on the route of the passage 110, and the damper D2 and the damper D3 are disposed on the route of the branch passages 114 and 116, respectively. Furthermore, the damper D4 is disposed on the route of the branch passage 118.

The amount of air introduced to the passage 110 is adjusted by the damper D1 and the damper D4, and the amount of air discharged from the passage 110 is adjusted by the damper D2 and the damper D3. In this manner, the temperature of the exhaust-heat gas transferred through the passage 110 is adjusted, and fresh outside air (air) is also introduced to the passage 110. Hence, the exhaust-heat gas adjusted to have a predetermined temperature (for example, about 60° C.) is appropriately supplied to the jacket portion 38 of the treatment tank 14 from the deodorizing apparatus 100.

The air (exhaust-heat gas) supplied to the inlet pipe 40a of the jacket portion 38 is circulated inside the passage 38a of the jacket portion 38, whereby nearly the entire treatment tank 14 is uniformly heated and is maintained warm to assist the maintenance of a suitable temperature in the treatment tank 14. Then, the air (exhaust-heat gas) is discharged to the atmosphere outside the treatment tank 14 through the outlet pipe 42a of the jacket portion 38.

That is, in this waste treatment apparatus 10, the heat of the exhaust-heat gas is utilized for heating and warming the treatment tank 14 by the assisting device 26. Therefore, the electric power cost used for heating the treatment tank 14 is also reduced.

Next, particularly with reference to FIG. 1, a description is given of a safety device 120, temperature sensors S1 to S9, and the switches SW1 and SW2 each disposed in this waste treatment apparatus 10.

The safety device 120 is defined by, for example, a low-pressure large-flow rate bi-directional solenoid valve and is provided to prevent an explosion accident when a large amount of methane gas is generated in the treatment tank 14. Specifically, if methane gas fills the treatment tank 14 during the operation of the waste treatment apparatus 10, the pressure inside the treatment tank 14 increases. When the pressure exceeds a preset pressure, the low-pressure large-flow rate bi-directional solenoid valve is automatically opened, and thus the pressure is reduced to thereby prevent an explosion.

Moreover, each of the temperature sensors S1 to S9 is defined by a thermocouple with a metallic protection tube. The temperature sensor S1 is provided to maintain the temperature inside the treatment tank 14 at a preset predetermined temperature by detecting the temperature inside the treatment tank 14 to control the blower 48 and the safety device 120. The temperature sensor S2 is a temperature sensor for adjusting the temperature of the drainage stored in the drainage tank 94 of the dust remover 84. The temperature sensor S3 is provided to detect the temperature at the inlet of the deodorizing apparatus 100 and is used for monitoring. The temperature sensor S4 is provided to detect the temperature at the inlet of heating unit 104 having the heater of the deodorizing apparatus 100 and is used to monitor the temperature after preheating in the preheating unit 102. The temperature sensor S5 is provided to prevent the temperature of the heating unit 104 having the heater from increasing excessively by detecting the temperature of the heating unit 104 having the heater of the deodorizing apparatus 100. The temperature sensor S6 is provided to detect and adjust the temperature at the outlet of the heating unit 104 having the heater of the deodorizing apparatus 100. The temperature sensor S7 is used to monitor and for detect the temperature of the catalyst unit 106 after catalytic reaction. The temperature sensor S8 is provided to detect the temperature at the outlet of the deodorizing apparatus 100 and is a temperature sensor to monitor the exhaust-heat gas. The temperature sensor S9 is used to monitor and detect the temperature of the exhaust-heat gas supplied to the jacket portion 38 of the treatment tank 14.

Furthermore, each of the switches SW1 and SW2 is defined by, for example, a limit switch. The switch SW1 is provided near the feeding port 44, and the switch SW2 is provided near the feeding port 46 of the crusher 28. Each of the switches SW1 and SW2 functions as a safety switch for accident prevention in order to prevent the hand of an operator from being caught in the agitator 52 and the crusher 28 via each of the feeding ports 44 and 46. In this case, when the lid 44a of the feeding port 44 and the lid 46a of the feeding port 46 are opened, the switches SW1 and SW2, respectively, stop the gear motor 60 driving the agitator 52 and the driving motor 29 for the crusher 28.

Figure 27:
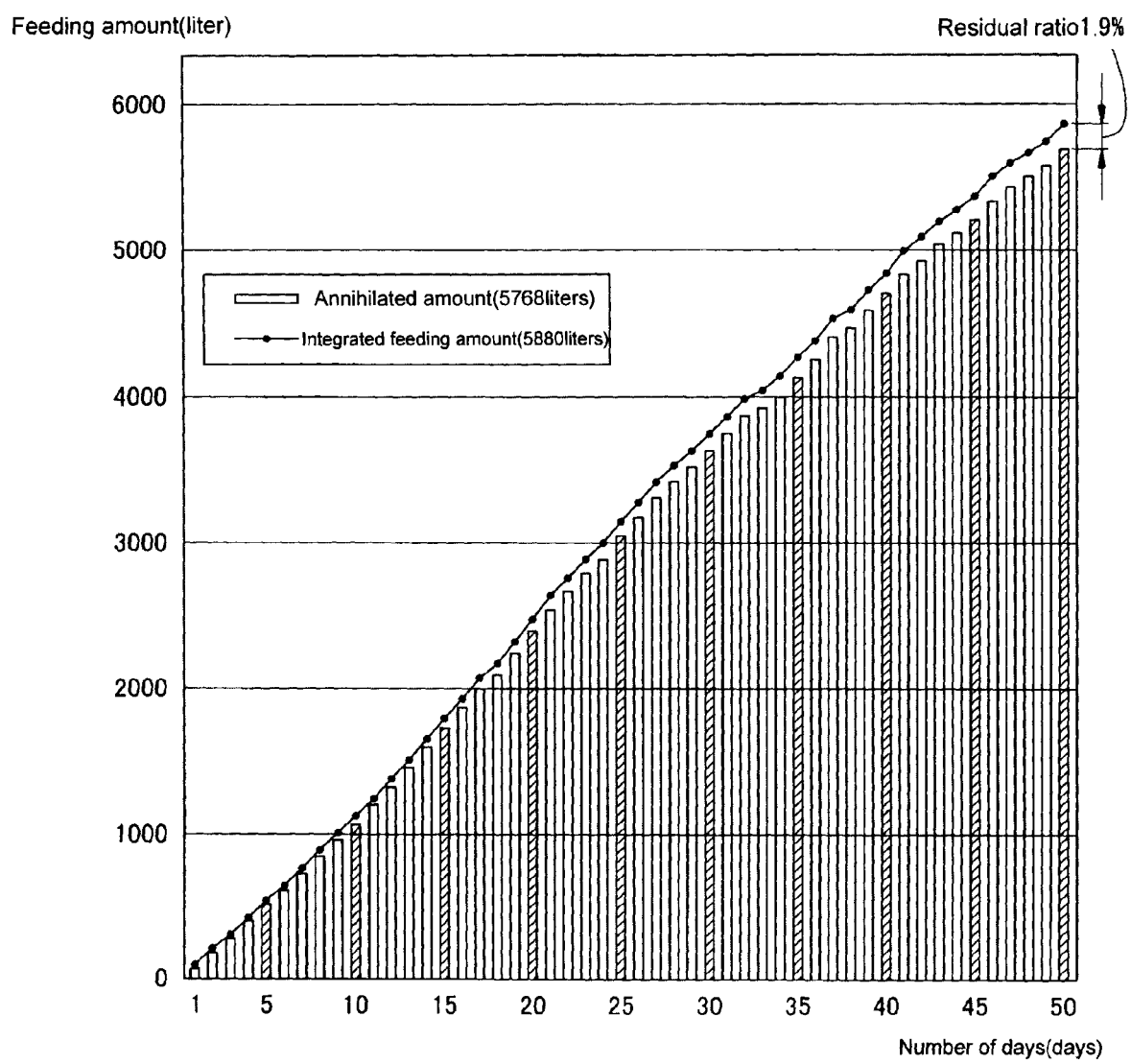
FIG. 27 is a graph showing annihilation effects when waste treatment is performed by use of the waste treatment apparatus according to the present invention shown in FIGS. 1 to 7.

Next, a description is given of test results showing annihilation effects of waste when waste treatment is performed using the waste treatment apparatus 10 according to this preferred embodiment. The waste fed to the waste treatment apparatus 10 includes precooked food including vegetables, meats, fishes, and other waste and is packaged in plastic, and pieces of paper, such as corrugated cardboard. The waste was fed once a day for 50 days. Table 1 shows the feeding amount of the waste for one feeding and the integrated feeding amount of the waste, and FIG. 27 shows the annihilation amount of the waste and the residual ratio thereof.

TABLE 1

| | Number of feedings | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Date | 10/4 | 10/6 | 10/7 | 10/8 | 10/9 | 10/10 | 10/11 | 10/14 | 10/15 | 10/16 | 10/17 | 10/18 | 10/20 | 10/21 | 10/22 |
| Feeding amount(kg) | 17.5 | 26 | 19 | 25 | 25 | 25 | 21 | 25 | 25 | 25 | 22 | 24 | 25 | 25 | 25 |
| Feeding amount(l) | 80 | 110 | 90 | 120 | 120 | 110 | 120 | 120 | 120 | 120 | 120 | 130 | 140 | 140 | 140 |
| Integrated feeding amount(kg) | 17.5 | 43.5 | 62.5 | 87.5 | 112.5 | 137.5 | 158.5 | 183.5 | 208.5 | 233.5 | 255.5 | 279.5 | 304.5 | 329.5 | 354.5 |
| Integrated feeding amount(l) | 80 | 190 | 280 | 400 | 520 | 630 | 750 | 870 | 990 | 1110 | 1230 | 1360 | 1500 | 1640 | 1780 |
| Number of buckets | 2 | 2.75 | 2.25 | 3 | 3 | 2.75 | 3 | 3 | 3 | 3 | 3 | 3.25 | 3.5 | 3.5 | 3.5 |

| | Number of feedings | | | | | | | | | | | | |
|---|---|---|---|---|---|---|---|---|---|---|---|---|---|
| | 16 | 17 | 18 | 19 | 20 | 21 | 22 | 23 | 24 | 25 | 26 | 27 | 28 |
| Date | 10/23 | 10/24 | 10/25 | 10/27 | 10/28 | 10/29 | 10/30 | 10/31 | 11/1 | 11/2 | 11/3 | 11/4 | 11/5 |
| Feeding amount(kg) | 25 | 25 | 25 | 25 | 25 | 25 | 25 | 25 | 25 | 25 | 27 | 27 | 26 |
| Feeding amount(l) | 140 | 140 | 100 | 150 | 160 | 150 | 140 | 120 | 110 | 160 | 130 | 140 | 120 |
| Integrated feeding amount(kg) | 379.5 | 404.5 | 429.5 | 454.5 | 479.5 | 504.5 | 529.5 | 554.5 | 579.5 | 604.5 | 631.5 | 658.5 | 684.5 |
| Integrated feeding amount(l) | 1920 | 2060 | 2160 | 2310 | 2470 | 2620 | 2760 | 2880 | 2990 | 3150 | 3280 | 3420 | 3540 |
| Number of buckets | 3.5 | 3.5 | 2.5 | 3.75 | 4 | 3.75 | 3.5 | 3 | 2.75 | 4 | 3.25 | 3.5 | 3 |

| | Number of feedings | | | | | | | | | | | | |
|---|---|---|---|---|---|---|---|---|---|---|---|---|---|
| | 29 | 30 | 31 | 32 | 33 | 34 | 35 | 36 | 37 | 38 | 39 | 40 | 41 |
| Date | 11/6 | 11/7 | 11/8 | 11/12 | 11/13 | 11/15 | 11/17 | 11/18 | 11/19 | 11/20 | 11/22 | 11/25 | 11/26 |
| Feeding amount(kg) | 23 | 25 | 27 | 26 | 16 | 25 | 26 | 26 | 27 | 19 | 27 | 25 | 25 |
| Feeding amount(l) | 100 | 120 | 120 | 120 | 60 | 90 | 130 | 120 | 150 | 70 | 120 | 120 | 140 |
| Integrated feeding amount(kg) | 709.5 | 734.5 | 761.5 | 787.5 | 803.5 | 828.5 | 854.5 | 880.5 | 907.5 | 926.5 | 953.5 | 978.5 | 1003.5 |

TABLE 1-continued

| Integrated feeding amount(l) | 3640 | 3760 | 3880 | 4000 | 4060 | 4150 | 4280 | 4400 | 4550 | 4620 | 4740 | 4860 | 5000 |
|---|---|---|---|---|---|---|---|---|---|---|---|---|---|
| Number of buckets | 2.5 | 3 | 3 | 3 | 1.5 | 2.25 | 3.25 | 3 | 3.75 | 1.75 | 3 | 3 | 3.5 |

| | Number of feedings | | | | | | | | |
|---|---|---|---|---|---|---|---|---|---|
| | | 42 | 43 | 44 | 45 | 46 | 47 | 48 | 49 | 50 |
| | Date | 11/27 | 11/28 | 11/29 | 11/30 | 12/1 | 12/2 | 12/3 | 12/4 | 12/5 |
| | Feeding amount(kg) | 18 | 26 | 25 | 20 | 25 | 23 | 13 | 22 | 23 |
| | Feeding amount(l) | 90 | 120 | 80 | 90 | 130 | 100 | 70 | 80 | 120 |
| | Integrated feeding amount(kg) | 1021.5 | 1047.5 | 1072.5 | 1092.5 | 1117.5 | 1140.5 | 1153.5 | 1175.5 | 1198.5 |
| | Integrated feeding amount(l) | 5090 | 5210 | 5290 | 5380 | 5510 | 5610 | 5680 | 5760 | 5880 |
| | Number of buckets | 2.25 | 3 | 2 | 2.25 | 3.25 | 2.5 | 1.75 | 2 | 3 |

According to these test results, the total feeding amount (integrated feeding amount) of the waste in 50 days was 5,880 liters, and the residual amount of the waste after 50 days was 112 liters. Specifically, the annihilation ratio of the waste when the waste treatment apparatus 10 is used is [(5,880−112)/5,880]×100=98.09(%), and thus the results show a high annihilation ratio of about 98.1(%). In this case, the residual ratio is very low (1.9%).

Furthermore, a description is given of test results of measurement of the concentrations of generated gases generated during waste treatment when waste treatment is carried out by use of the waste treatment apparatus 10 according to this embodiment. In this test, the gas concentration of each of generated gases was measured. The generated gases include carbon dioxide, ammonia, and amines and are generated as the waste treatment time elapses. The measurements were made in the case where 70 liters of raw waste including vegetables, fishes, leftovers of a box lunch, and other raw waste were fed to the waste treatment apparatus, in the case where 100 liters of paper waste including newspaper, corrugated cardboard, and other paper waste were fed to the waste treatment apparatus, and in the case where 70 liters of plastic waste including plastic bags, paper diapers, foamed food trays, and other plastic waste were fed to the waste treatment apparatus.

Figure 28:
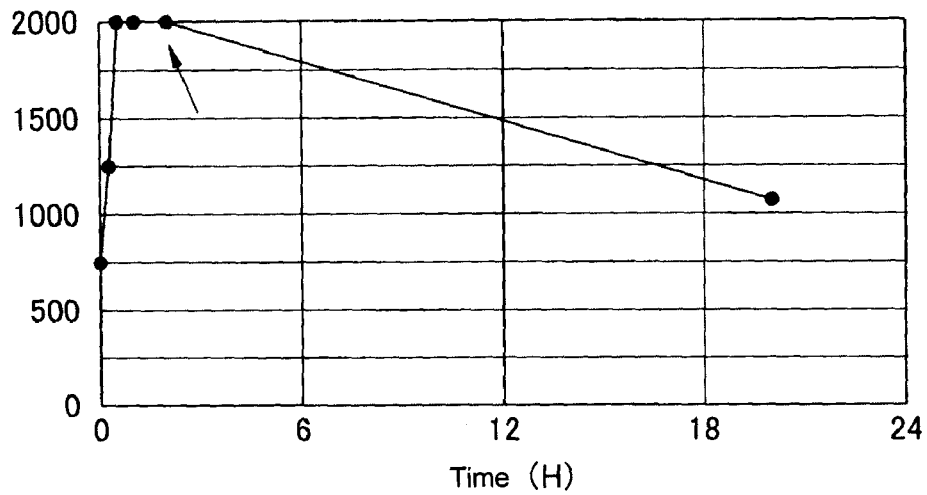
FIG. 28 is a set of graphs showing measurement results (temporal variations) of generated gas concentrations in the treatment tank when raw waste is treated by use of the waste treatment apparatus according to the present invention shown in FIGS. 1 to 7.
Figure 28:
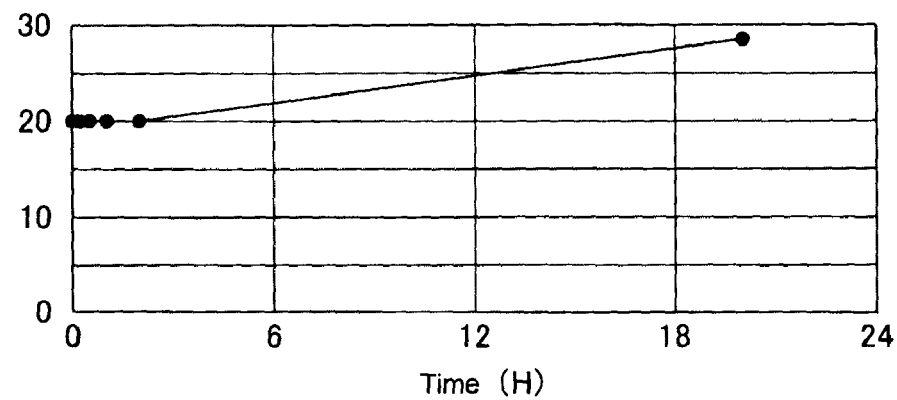
Figure 28:
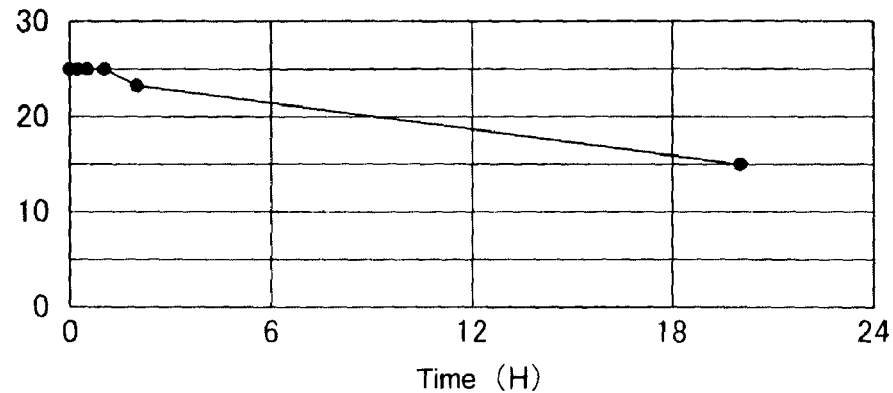
Figure 29:
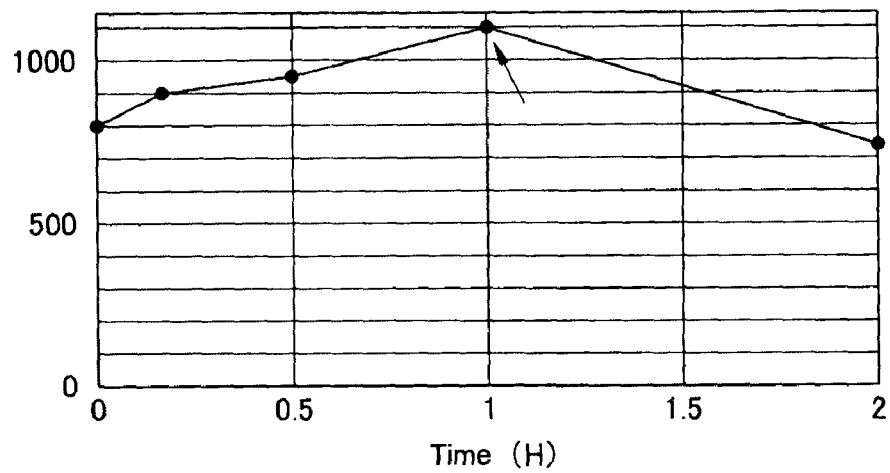
FIG. 29 is a set of graphs showing measurement results (temporal variations) of generated gas concentrations in the treatment tank when paper waste is treated by use of the waste treatment apparatus according to the present invention shown in FIGS. 1 to 7.
Figure 29:
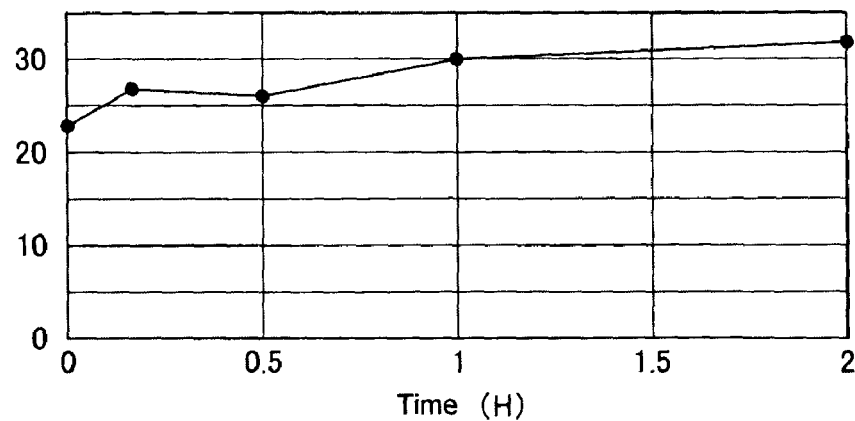
Figure 29:
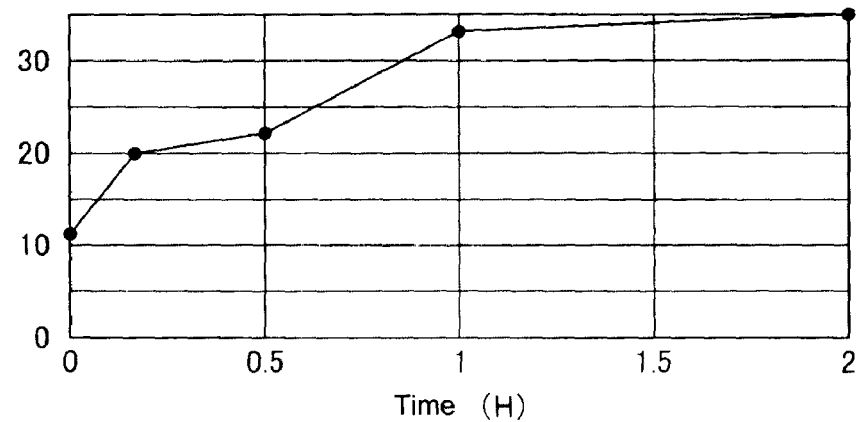

The test results for the raw waste are shown in Table 2 and FIG. 28, and the test results for the paper waste are shown in Table 3 and FIG. 29. Also, the test results for the plastic waste are shown in Table 4 and FIG. 30.

TABLE 2

Concentrations of gases generated during treatment of raw wastes: Test results

| | Measurement item | | | | | |
|---|---|---|---|---|---|---|
| Elapsed time | Carbon dioxide (ppm) | Ammonia (ppm) | Amines (ppm) | Hydrogen sulfide (ppm) | Oxygen (ppm) | Moisture (%) |
| Before feeding | 750 | 20 | 25 | 10 ↓ | 21.03 | — |
| After 10 minutes | 1250 | 20 | 25 | 10 ↓ | 21.03 | — |
| After 30 minutes | 2000 | 20 | 25 | 10 ↓ | 21.03 | — |
| After 1 hour | 2000 | 20 | 23 | 10 ↓ | 21.02 | 4.71 |
| After 2 hours | 2000 | 20 | 19 | 10 ↓ | 20.95 | — |
| After 20 hours | 1050 | 28 | 15 | 10 ↓ | 21.00 | — |

TABLE 3

Concentrations of gases generated during treatment of paper: Test results

| | Measurement item | | | | | |
|---|---|---|---|---|---|---|
| Elapsed time | Carbon dioxide (ppm) | Ammonia (ppm) | Amines (ppm) | Hydrogen sulfide (ppm) | Oxygen (ppm) | Moisture (%) |
| Before feeding | 800 | 23 | 10 | 10 ↓ | 21.07 | — |
| After 10 minutes | 900 | 27 | 20 | 10 ↓ | 21.06 | — |
| After 30 minutes | 850 | 26 | 22 | 10 ↓ | 21.07 | — |
| After 1 hour | 1100 | 30 | 33 | 10 ↓ | 21.07 | 2.35 |
| After 2 hours | 750 | 32 | 35 | 10 ↓ | 21.09 | — |

TABLE 4

Concentrations of gases generated during treatment of plastics: Test results

| Elapsed time | Carbon dioxide (ppm) | Ammonia (ppm) | Amines (ppm) | Hydrogen sulfide (ppm) | Styrene (ppm) | Oxygen (ppm) | Moisture (%) |
|---|---|---|---|---|---|---|---|
| Before feeding | 1050 | 28 | 15 | 10 ↓ | 0.2 ↓ | 21.00 | — |
| After 10 minutes | 1400 | 29 | 38 | 10 ↓ | 0.2 ↓ | 21.00 | — |
| After 30 minutes | 1400 | 29 | 40 | 10 ↓ | 0.2 ↓ | 21.03 | — |
| After 1 hour | 1400 | 38 | 40 | 10 ↓ | 0.2 ↓ | 21.03 | 4.34 |
| After 2 hours | 1550 | 30 | 30 | 10 ↓ | 0.2 ↓ | 21.04 | — |
| After 5 hours | 1750 | 19 | 13 | 10 ↓ | 0.2 ↓ | 21.03 | — |
| After 24 hours | 800 | 10 | 9 | 10 ↓ | 0.2 ↓ | 21.00 | — |

According to the above test results, when the raw waste was treated, the carbon dioxide concentration reached a high value of 2,000 ppm at 30 minutes after the feeding of the raw waste as shown in Table 2 and FIG. 28. Thus, it can be seen that the decomposition of the raw waste by the microorganisms was most activated at this point. In this case, it can be seen that the decomposition treatment significantly proceeded from 30 minutes after the feeding to 2 hours after the feeding.

Furthermore, when the paper waste was treated, the carbon dioxide concentration reached a high value of 1,100 ppm at one hour after the feeding of the paper waste as shown in Table 3 and FIG. 29. Thus, it can be seen that the decomposition of the raw waste by the microorganisms was most activated at this point.

Figure 30:
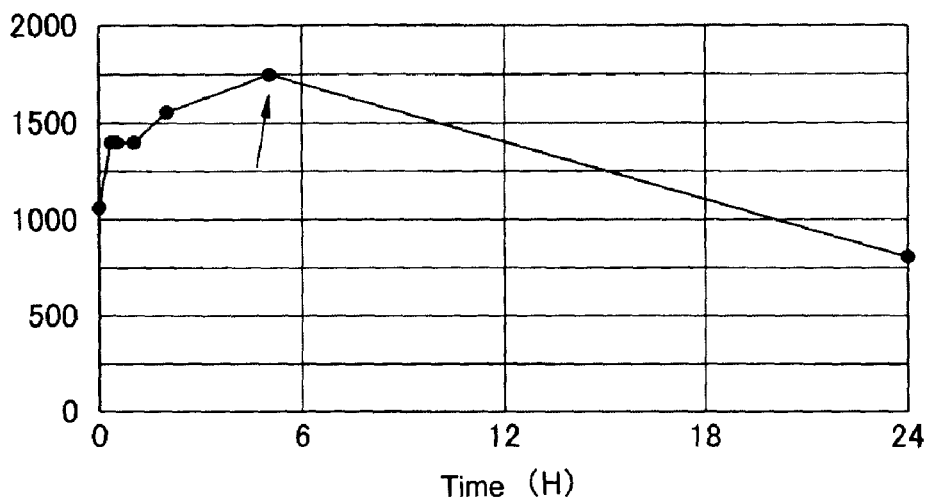
FIG. 30 is a set of graphs showing measurement results (temporal variations) of generated gas concentrations in the treatment tank when plastic waste is treated by use of the waste treatment apparatus according to the present invention shown in FIGS. 1 to 7.
Figure 30:
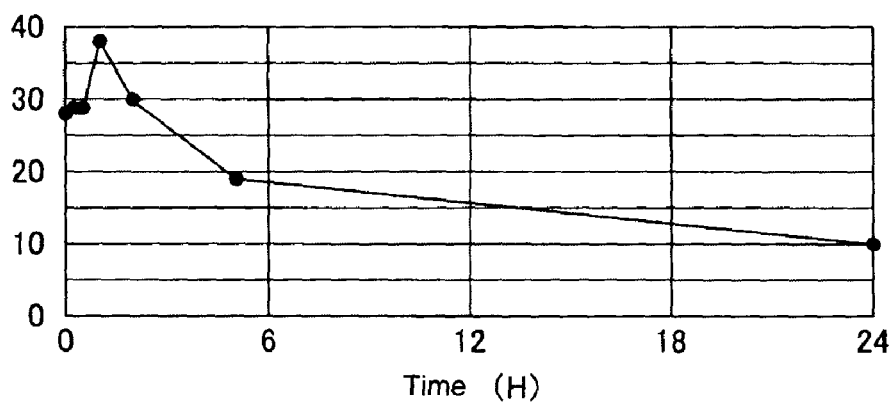
Figure 30:
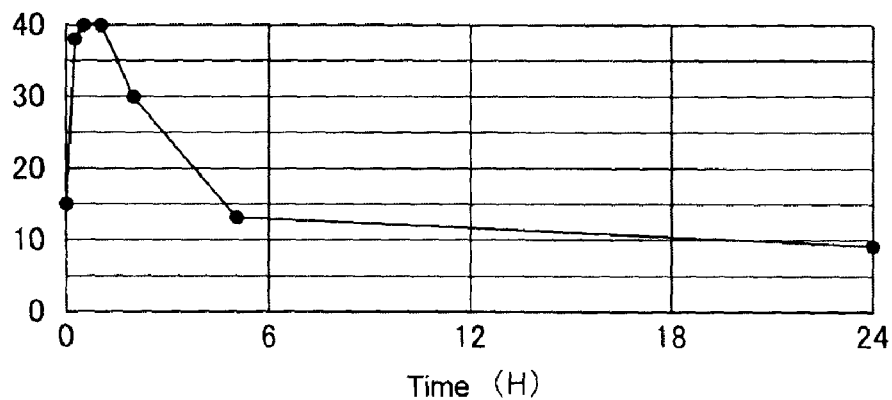

Moreover, when the plastic waste was treated, the carbon dioxide concentration reached a high value of 1,750 ppm at five hours after the feeding of the plastic waste as shown in Table 4 and FIG. 30. Thus, it can be seen that the decomposition of the raw waste by the microorganisms was most activated at this point.

Therefore, it can be seen that, according to this waste treatment apparatus 10, the decomposition treatment of raw waste, paper waste, and plastic waste is performed in a short time.

In the waste treatment apparatus 10 according to this preferred embodiment, the fungus bed and the waste (materials to be treated) are grounded and scraped by the agitating tools 66a and 66b, and the fungus bed includes crushed pieces (pulverized pieces) composed of sintered porous materials to thereby effectively perform grinding of the waste (materials to be treated). In addition to this, the activation of the waste decomposition action by the microorganisms is assisted by providing, to the jacket portion 38 of the treatment tank 14, the heat of the exhaust-heat gas supplied from the deodorizing apparatus 100. In particular, these are performed comprehensively, and thus the agitation efficiency and the decomposition efficiency are further improved in the treatment tank 14.

In this manner, not only raw waste but also plastic waste such as plastic bags, paper diapers, and food trays can be decomposed together to perform the volume reduction-annihilation treatment. In this waste treatment apparatus 10, since waste is not incinerated, dioxins are not generated, and compost is not generated in contrast to a conventional compost type apparatus.

The waste treatment apparatus according to the present invention efficiently agitates raw waste such as food waste together with plastic waste such as plastic products and paper waste such as corrugated cardboard and newspaper to crush and divide the waste into small pieces. Thus, the waste treatment apparatus reduces the volume of the waste through the decomposing action of microorganisms, and thus the waste is annihilated. Therefore, the need to separate waste is eliminated, the waste treatment apparatus is particularly suitable for treatment of waste from, for example, restaurants, supermarkets, schools, and business organizations.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A waste treatment apparatus for performing volume reduction-annihilation treatment by decomposing waste using microorganisms while the waste is agitated, the waste treatment apparatus comprising:
   a treatment tank which accommodates the microorganisms and the waste; and
   an agitation device arranged to agitate the microorganisms and the waste, the agitation device including a rotation shaft provided in the treatment tank and a plurality of agitating tools arranged at predetermined intervals in an axial direction of the rotation shaft; wherein
   at least one of the agitating tools defines a first agitating tool that includes a pair of paddle arms and a pair of blades, the pair of paddle arms being disposed so as to be opposed to each other in a diameter direction of the rotation shaft, each of the pair of blades being disposed in an end portion of a respective one of the pair of paddle arms so as to be inclined with respect to an axis of the respective one of the pair of paddle arms and so as to be separated from an inner wall of the treatment tank by a predetermined distance;
   each of the pair of blades includes a leading edge and a trailing edge arranged such that the leading edge is disposed ahead of the trailing edge in a rotation direction of the pair of paddle arms;
   one of the pair of blades is inclined forward such that the leading edge is disposed closer to the rotation shaft than the trailing edge, and the other one of the pair of blades is inclined backward such that trailing edge is disposed closer to the rotation shaft than the leading edge;
   at least two of the agitating tools define second agitating tools that include a pair of paddle arms, the pair of paddle arms being disposed so as to be opposed to each other in a diameter direction of the rotation shaft, each of the pair of paddle arms includes a substantially rectangular plate-shaped arm body including a groove portion in a principal surface thereof; and the at least two second agitating tools are disposed at opposed ends of the rotation shaft in the axial direction of the rotation shaft and the at least one first agitating tool is disposed therebetween.

2. The waste treatment apparatus according to claim 1, wherein an inclination angle of the blade with respect to the paddle arm is set within a range of about 1° to about 15°.

3. A waste treatment apparatus for performing volume reduction-annihilation treatment by decomposing, by aerobic microorganisms, waste including plastic waste, raw waste, and paper waste while the waste is agitated together with the aerobic microorganisms and a support material to which the aerobic microorganisms adhere and which functions as a residence of the aerobic microorganisms, the waste treatment apparatus comprising:

a treatment tank which accommodates the aerobic microorganisms and the support material together with the waste;

an agitation device arranged to agitate together the aerobic microorganisms, the support material, and the waste;

an activation device arranged to activate decomposition action of the aerobic microorganisms on the waste by supplying air into the treatment tank and heating an inside of the treatment tank to a predetermined temperature;

an exhaust device arranged to exhaust exhaust gas containing water vapor and carbon dioxide generated in the treatment tank to outside the treatment tank;

a dust removal device arranged to remove dust in the exhaust gas exhausted by the exhaust device and to evaporate moisture in the exhaust gas; and a deodorization device arranged to remove foul odors in the exhaust gas treated by the dust removal device by heating the exhaust gas at high temperatures; wherein the agitation device includes a rotation shaft provided in the treatment tank and a plurality of agitating tools arranged at predetermined distances apart in an axial direction of the rotation shaft;

at least one of the agitating tools defines a first agitating tool that includes a pair of paddle arms and a pair of blades, the pair of paddle arms being disposed so as to be opposed to each other in a diameter direction of the rotation shaft, each of the pair of blades being disposed in an end portion of a respective one of the pair of paddle arms so as to be inclined with respect to an axis of the respective one of the pair of paddle arms and so as to be separated from an inner wall of the treatment tank by a predetermined distance;

each of the pair of blades includes a leading edge and a trailing edge arranged such that the leading edge is disposed ahead of the trailing edge in a rotation direction of the pair of paddle arms;

one of the blades being inclined forward such that the leading edge is disposed closer to the rotation shaft than the trailing edge, and the other one of the pair of blades being inclined backward such that the trailing edge is disposed closer to the rotation shaft than the leading edge;

at least two the agitating tools define second agitating tools that include a pair of paddle arms, the pair of paddle arms being disposed so as to be opposed to each other in a diameter direction of the rotation shaft, each of the pair of paddle arms includes a substantially rectangular plate-shaped arm body including a groove portion in a principal surface thereof; and the at least two second agitating tools are disposed at opposed ends of the rotation shaft in the axial direction of the rotation shaft and the at least one first agitating tool is disposed therebetween.

4. The waste treatment apparatus according to claim 3, further comprising an assisting device arranged to assist heating of the treatment tank through heat of exhaust-heat gas deodorized by the deodorization device.

5. The waste treatment apparatus according to claim 3, wherein the support material to which the aerobic microorganisms adhere and which functions as the residence of the aerobic microorganisms includes sharp crushed pieced of a sintered porous material.

6. The waste treatment apparatus according to claim 3, wherein an inclination angle of the blade with respect to the paddle arm is set within a range of about 1° to about 15°.

7. The waste treatment apparatus according to claim 1, wherein the groove has a V-shaped cross-section.

8. The waste treatment apparatus according to claim 3, wherein the groove has a V-shaped cross-section.

9. The waste treatment apparatus according to claim 2, further comprising a support material for which the microorganisms adhere, wherein the thickness of the support material which adheres to an inner wall of the treatment tank and is stacked thereon is set not to exceed 50 mm.

10. The waste treatment apparatus according to claim 6, wherein the thickness of the support material which adheres to an inner wall of the treatment tank and is stacked thereon is set not to exceed 50 mm.

* * * * *